United States Patent
Morris et al.

(10) Patent No.: US 6,682,193 B1
(45) Date of Patent: *Jan. 27, 2004

(54) WIDE FIELD SPHERICAL LENSES AND PROTECTIVE EYEWEAR

(75) Inventors: Michael Alan Morris, Santa Rosa, CA (US); Colin Maurice Perrott, Mount Barker (AU); Simon J. Edwards, St. Peters (AU); Ray Steven Spratt, Petaluma, CA (US); David Lawrence Carr, Napa, CA (US); Brandon Yip, Belair (AU); Brian Adams, Huntfield Heights (AU); Paraic Begley, Adelaide (AU); Richard Simon Blacker, Sonoma, CA (US)

(73) Assignee: Sola International Holdings Ltd., Lonsdale (AU)

(*) Notice: Subject to any disclaimer, the term of this patent is extended or adjusted under 35 U.S.C. 154(b) by 0 days.

This patent is subject to a terminal disclaimer.

(21) Appl. No.: 09/698,270

(22) Filed: Oct. 30, 2000

Related U.S. Application Data

(63) Continuation-in-part of application No. 09/658,496, filed on Sep. 8, 2000, now Pat. No. 6,440,335, and a continuation-in-part of application No. PCT/AU99/01029, filed on Nov. 19, 1999, and a continuation-in-part of application No. 09/223,006, filed on Dec. 30, 1998, now Pat. No. 6,142,624.

(51) Int. Cl.$^7$ ................................................ G02C 7/10
(52) U.S. Cl. ........................ 351/163; 351/44; 351/158; 351/159; 351/174
(58) Field of Search ........................... 351/158–159, 351/41, 43–44, 163, 177–178

(56) References Cited

U.S. PATENT DOCUMENTS

| | | | |
|---|---|---|---|
| 1,741,536 A | 12/1929 | Rayton | 351/159 |
| 1,918,999 A | 7/1933 | Wells | 351/159 |
| 1,942,400 A | 1/1934 | Glancy | 351/172 |
| 2,088,262 A | 7/1937 | Grano | 351/43 |
| 2,758,510 A | 8/1956 | Auwärter | 359/581 |

(List continued on next page.)

FOREIGN PATENT DOCUMENTS

| | | |
|---|---|---|
| EP | 0225034 | 6/1987 |
| EP | 0446698 | 9/1991 |
| EP | 0547762 | 6/1993 |
| EP | 640523 A1 | 3/1995 |
| FR | 2688322 | 9/1993 |
| FR | 1509090 | 11/1996 |
| GB | 680400 | 10/1952 |
| GB | 2281635 | 3/1995 |
| WO | 96/13236 | 5/1996 |
| WO | 97/21139 | 6/1997 |
| WO | 97/35224 | 9/1997 |
| WO | 97/41483 | 11/1997 |
| WO | 00/33111 | 6/2000 |

OTHER PUBLICATIONS

M. Jalie, The Principles of Ophthalmic Lenses, 1994, pp. 1–27, 30–33, 151–152, 422–441, and 462–468 (publisher: The Association of British Dispensing Opticians).

(List continued on next page.)

Primary Examiner—Jordan M. Schwartz
(74) Attorney, Agent, or Firm—Burns, Doane, Swecker & Mathis, L.L.P.

(57) ABSTRACT

The present invention relates to novel ophthalmic lens elements and eyewear having wide field of view, low distortion, improved astigmatism correction where required and enhanced eye protection properties. Series of lens elements have steeply curved spherical reference surfaces. The edged lenses of the series have approximately consistent aperture size, shape and hollow depth across a range of common prescriptions. Novel sunglasses, laser protective eyewear, and lens edgings, coatings and frames are included in the invention.

44 Claims, 31 Drawing Sheets

U.S. PATENT DOCUMENTS

| | | | |
|---|---|---|---|
| 3,040,616 A | 6/1962 | Simpson | 359/481 |
| 3,526,449 A | 9/1970 | Bolle et al. | 351/41 |
| 3,672,750 A | 6/1972 | Hagen | 351/43 |
| 4,070,097 A | 1/1978 | Gelber | 359/581 |
| 4,447,914 A | 5/1984 | Jannard | 2/432 |
| 4,555,372 A | 11/1985 | Kunzler et al. | 264/2.1 |
| 4,741,611 A | 5/1988 | Burns | 351/44 |
| 4,778,266 A | 10/1988 | Maitenaz | 351/168 |
| 4,779,972 A | 10/1988 | Gottlieb | 351/177 |
| D311,197 S | 10/1990 | Jannard | D16/127 |
| D320,402 S | 10/1991 | Jannard et al. | D16/127 |
| D323,333 S | 1/1992 | Jannard et al. | D16/112 |
| D324,394 S | 3/1992 | Jannard | D16/102 |
| D324,528 S | 3/1992 | Jannard | D16/102 |
| D325,040 S | 3/1992 | Jannard | D16/102 |
| 5,093,940 A | 3/1992 | Nishiyama | 2/441 |
| 5,094,520 A | 3/1992 | Reshef et al. | 351/159 |
| D328,468 S | 8/1992 | Jannard | D16/102 |
| D329,445 S | 9/1992 | Jannard | D16/102 |
| D330,035 S | 10/1992 | Jannard | D16/102 |
| D330,716 S | 11/1992 | Jannard | D16/116 |
| D330,903 S | 11/1992 | Jannard | D16/116 |
| D331,587 S | 12/1992 | Jannard et al. | D16/123 |
| D331,763 S | 12/1992 | Jannard | D16/101 |
| D333,145 S | 2/1993 | Jannard | D16/102 |
| 5,187,505 A | 2/1993 | Spector | 351/159 |
| D335,887 S | 5/1993 | Jannard | D16/101 |
| 5,208,614 A | 5/1993 | Jannard | 351/41 |
| D336,908 S | 6/1993 | Jannard | D16/101 |
| 5,249,001 A | 9/1993 | Jannard | 351/123 |
| D342,534 S | 12/1993 | Jannard et al. | D16/102 |
| D342,959 S | 1/1994 | Jannard et al. | D16/107 |
| D343,182 S | 1/1994 | Jannard | D16/102 |
| D344,281 S | 2/1994 | Jannard et al. | D16/102 |
| D344,742 S | 3/1994 | Jannard | D16/102 |
| 5,313,671 A | 5/1994 | Flory | 2/428 |
| 5,359,371 A | 10/1994 | Nolan | 351/43 |
| D354,968 S | 1/1995 | Jannard | D16/101 |
| 5,387,949 A | 2/1995 | Tackles | 351/121 |
| 5,390,373 A | 2/1995 | Flory | 2/430 |
| D356,323 S | 3/1995 | Yee | D16/315 |
| D356,324 S | 3/1995 | Yee | D16/315 |
| D358,600 S | 5/1995 | Jannard | D16/335 |
| D358,829 S | 5/1995 | Jannard et al. | D16/101 |
| D359,302 S | 6/1995 | Yee et al. | D16/314 |
| D359,748 S | 6/1995 | Yee | D16/315 |
| D359,749 S | 6/1995 | Yee | D16/315 |
| D359,971 S | 7/1995 | Jannard | D16/101 |
| D365,357 S | 12/1995 | Jannard et al. | D16/335 |
| D365,591 S | 12/1995 | Jannard et al. | D16/326 |
| D368,921 S | 4/1996 | Yee et al. | D16/101 |
| D369,375 S | 4/1996 | Jannard et al. | D16/326 |
| 5,517,260 A | 5/1996 | Glady et al. | 351/169 |
| 5,541,674 A | 7/1996 | Jannard | 351/41 |
| 5,550,599 A | 8/1996 | Jannard | 351/159 |
| D374,448 S | 10/1996 | Yee et al. | D16/101 |
| D376,162 S | 12/1996 | Yee et al. | D16/101 |
| D376,163 S | 12/1996 | Jannard et al. | D16/101 |
| D376,609 S | 12/1996 | Yee et al. | D16/101 |
| D377,498 S | 1/1997 | Jannard et al. | D16/315 |
| 5,604,547 A | 2/1997 | Davis et al. | 351/44 |
| 5,610,668 A | 3/1997 | Mage | 351/62 |
| 5,625,425 A | 4/1997 | Kranhouse | 351/43 |
| 5,638,145 A | 6/1997 | Jannard | 351/62 |
| 5,646,706 A * | 7/1997 | Izumitani | 351/110 |
| 5,648,832 A | 7/1997 | Houston et al. | 351/159 |
| D384,362 S | 9/1997 | Yee | D16/315 |
| D384,364 S | 9/1997 | Yee | D16/330 |
| D384,686 S | 10/1997 | Jannard et al. | D16/326 |
| D385,291 S | 10/1997 | Jannard et al. | D16/326 |
| 5,689,323 A | 11/1997 | Houston et al. | 351/41 |
| D388,816 S | 1/1998 | Jannard et al. | D16/326 |
| 5,708,489 A | 1/1998 | Jannard | 351/41 |
| 5,719,705 A | 2/1998 | Machol | 359/581 |
| D392,662 S | 3/1998 | Jannard et al. | D16/321 |
| 5,730,155 A | 3/1998 | Allen | 128/897 |
| 5,732,415 A | 3/1998 | Boyd | 2/426 |
| 5,760,868 A | 6/1998 | Jannard | 351/153 |
| 5,764,332 A | 6/1998 | Kranhouse | 351/43 |
| 5,774,201 A | 6/1998 | Tackles | 351/159 |
| D397,132 S | 8/1998 | Yee | D16/315 |
| D397,350 S | 8/1998 | Jannard et al. | D16/326 |
| D398,022 S | 9/1998 | Jannard et al. | D16/326 |
| D398,326 S | 9/1998 | Jannard et al. | D16/326 |
| 5,801,805 A | 9/1998 | Mage | 351/62 |
| 5,805,261 A | 9/1998 | Houston | 351/126 |
| D399,239 S | 10/1998 | Jannard et al. | D16/326 |
| D399,240 S | 10/1998 | Jannard et al. | D16/326 |
| D399,243 S | 10/1998 | Jannard et al. | D16/335 |
| D399,519 S | 10/1998 | Yee | D16/314 |
| D399,865 S | 10/1998 | Jannard et al. | D16/326 |
| D399,866 S | 10/1998 | Yee | D16/330 |
| 5,825,455 A | 10/1998 | Fecteau et al. | 351/159 |
| D402,304 S | 12/1998 | Jannard et al. | D16/326 |
| 5,846,650 A | 12/1998 | Ko et al. | 428/336 |
| D404,747 S | 1/1999 | Yee et al. | D16/101 |
| D404,754 S | 1/1999 | Yee et al. | D16/326 |
| 5,861,935 A | 1/1999 | Morris et al. | 351/169 |
| D405,102 S | 2/1999 | Moritz et al. | D16/312 |
| D407,428 S | 3/1999 | Jannard et al. | D16/319 |
| D408,049 S | 4/1999 | Jannard et al. | D16/326 |
| D410,484 S | 6/1999 | Jannard et al. | D16/326 |
| D410,485 S | 6/1999 | Jannard et al. | D16/326 |
| 5,915,542 A | 6/1999 | Swiet | 2/441 |
| 5,959,518 A | 9/1999 | Passow | 335/113 |
| 6,077,569 A | 6/2000 | Knapp et al. | 427/534 |
| 6,129,435 A | 10/2000 | Reichow et al. | 351/41 |
| 6,142,624 A | 11/2000 | Morris et al. | 351/159 |
| 6,343,860 B1 * | 2/2002 | Pierotti | 351/159 |
| D461,200 S | 8/2002 | Pierotti et al. | D16/101 |
| 2002/0071093 A1 | 6/2002 | Pierotti | |

OTHER PUBLICATIONS

H.A. Macleod, Thin–Film Optical Filters, 1969, pp. 230–233, 314–357 (publishers: McGraw–Hill Publishing Company and IOP Publishing Ltd.).

Jeffrey M. Kingsbury, et al., Process for Molding Thermoplastic Lenses and, Steeply Curved and/or Thin Lenses Produced Thereby, copending patent application Ser. No. 09/658,496 filed Sep. 8, 2000.

Jeffrey M. Kingsbury, et al., Molding Method for Manufacturing Thin Thermoplastic Lenses, copending patent application Ser. No. 09/277,035 filed Mar. 25, 1999.

Greenhouse Grown Products, Inc.; Whatever Your Passion . . . ; Flyer ©2000/2001.

J. K. Crosley et al.; Visual and Field–of–View Evaluation of the M–43 Protective Mask with Prescription Eyepieces; U.S. Army Aeromedical Research Laboratory (USAARL) Report No. 91–13; Mar. 1991; cover and pp. 4–5.

R. M. Wildzunas et al.; Visual Performance Effects and User Acceptance of the M43A1 Aviation Protective Mask Front-serts; U.S. Army Aeromedical Research Laboratory (USAARL) Report No. 96–07; Jan. 1996; cover and p. 1137.

R. R. Levine et al.; Visual Performance of Contact Lens–Corrected Ametropic Aviators with the M–43 Protective Mask; U.S. Army Aeromedical Research laboratory (USAARL) Report No. 90–12; May 1990; cover and p. 5.

Material at http://www.ilcdover.com/products/CB-SysMasks/M43.htm and two photographs, 1996 (the Writting Pages Provided).

N. R. Brletich et al.,; Worldwide NBC Mask Handbook; Defense Technical Information Center, Alexandria, VA; Sep. 1992; first three cover pages and pp. 389–393.

Photographs and drawings of the "Apache Helicopter" lenses as described in the Supplemental Information Disclosure Statement, 1985.

* cited by examiner

A "Tscherning" ellipse

"ROTOID"
Lenticular
(after M. Jalie)

PRIOR ART

Morris - Spratt Diagram

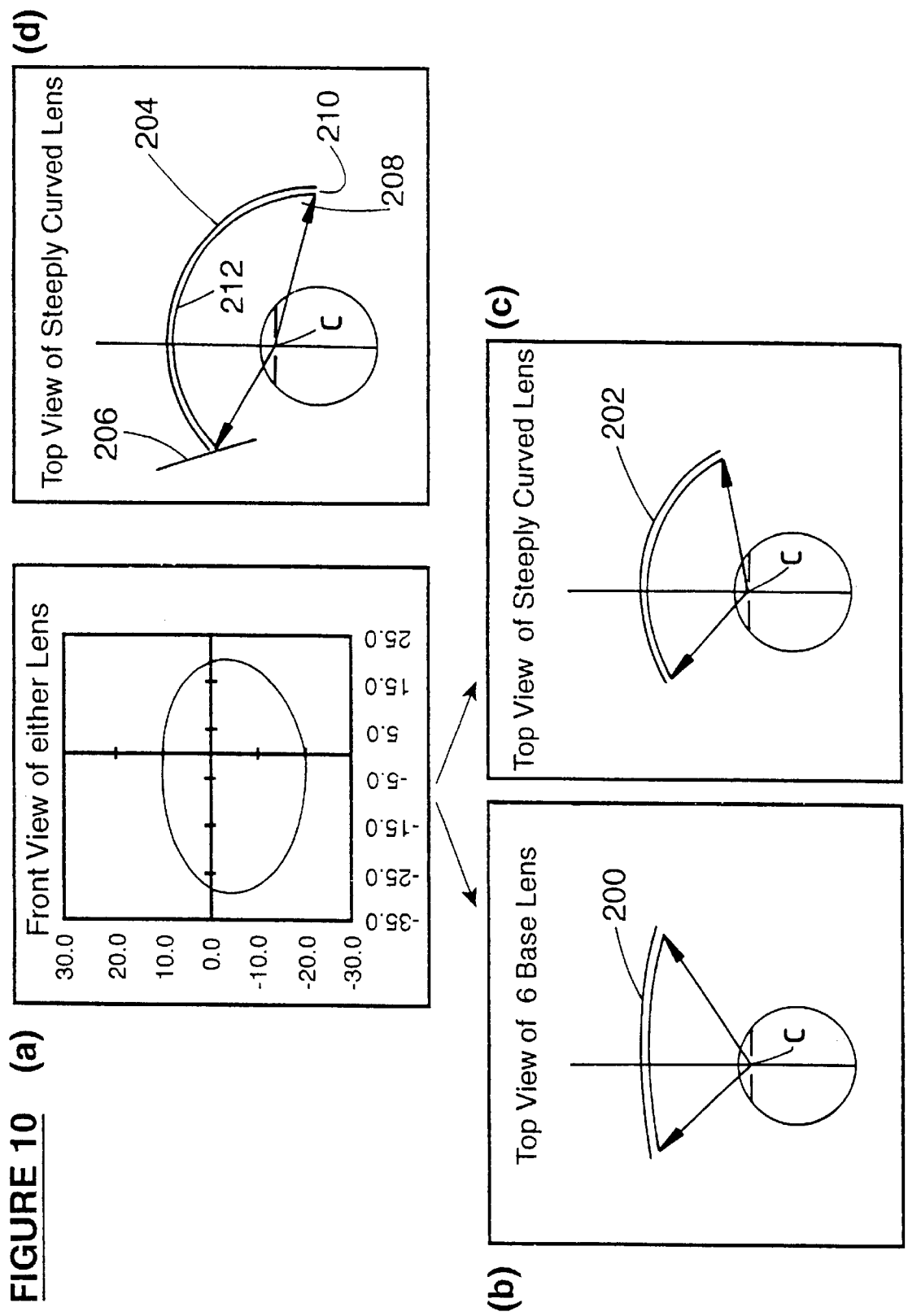

surface astigmatism barrel donut

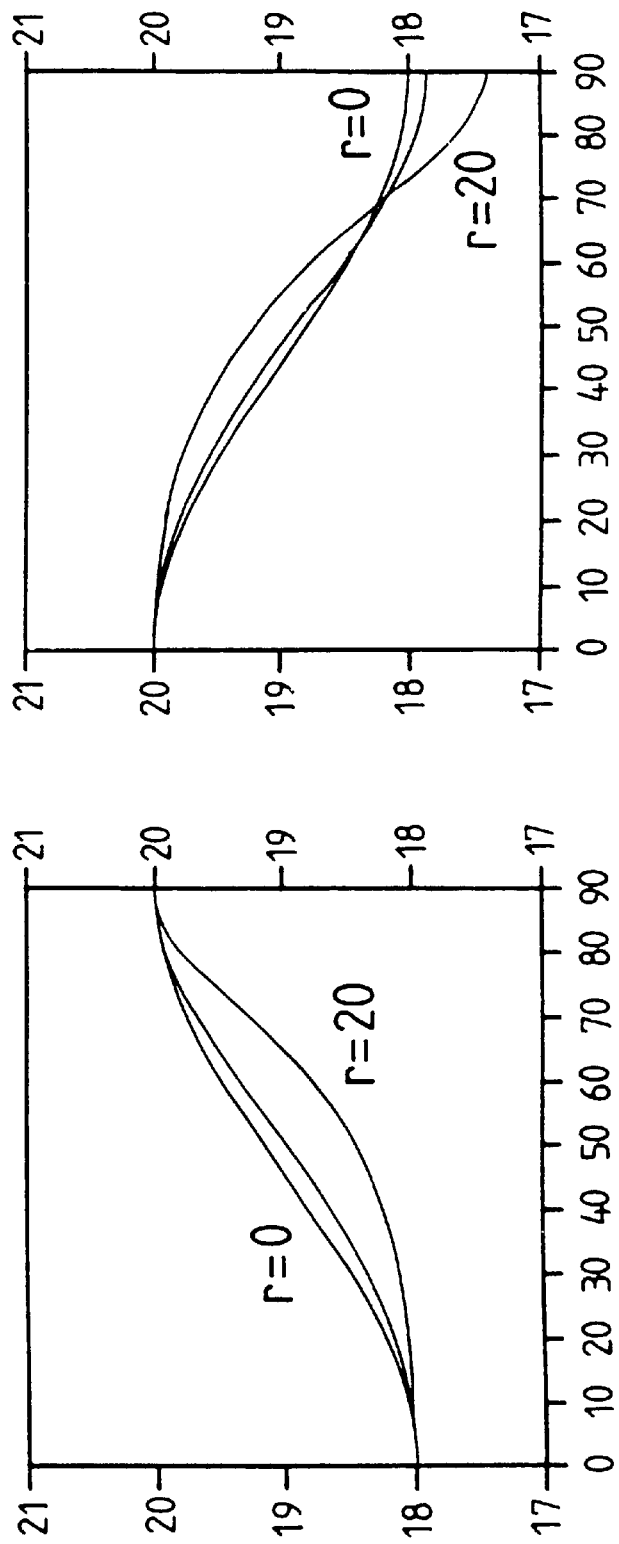
FIGURE 12(b) sagittal
FIGURE 12(a) tangential
donut

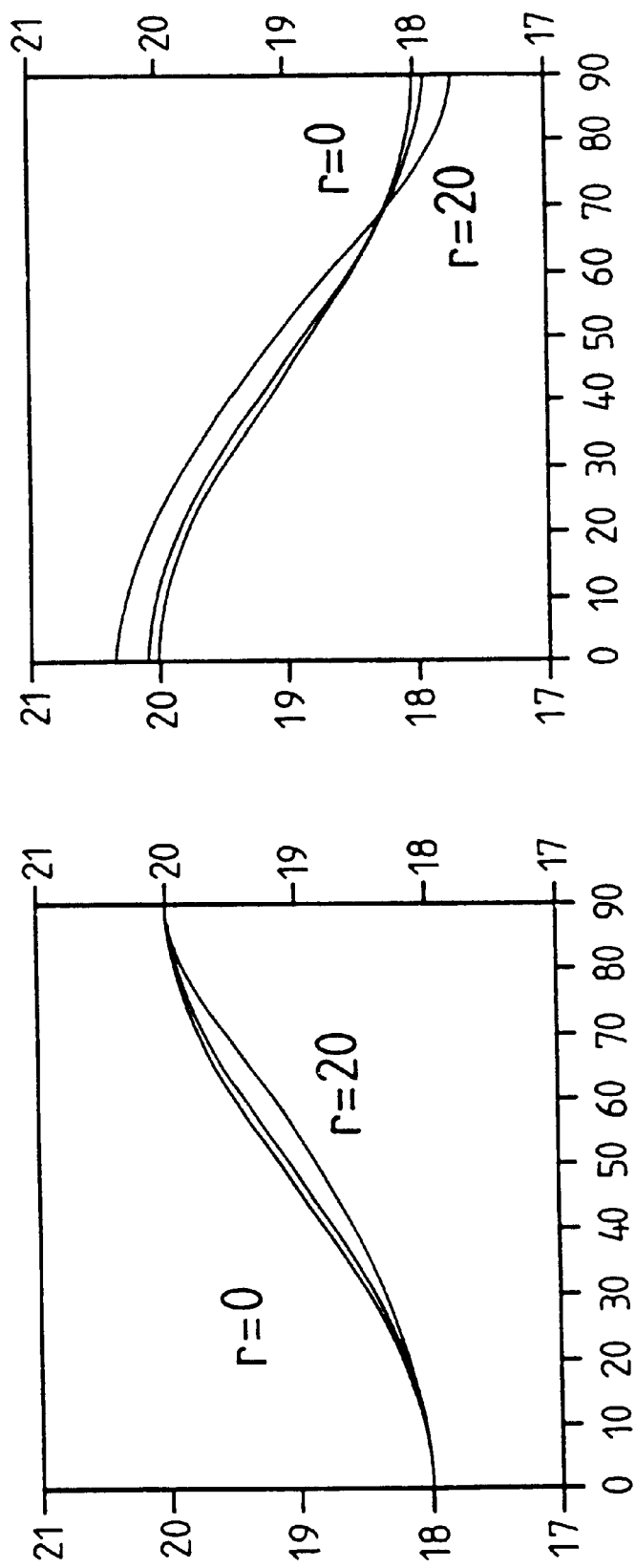

FIGURE 15
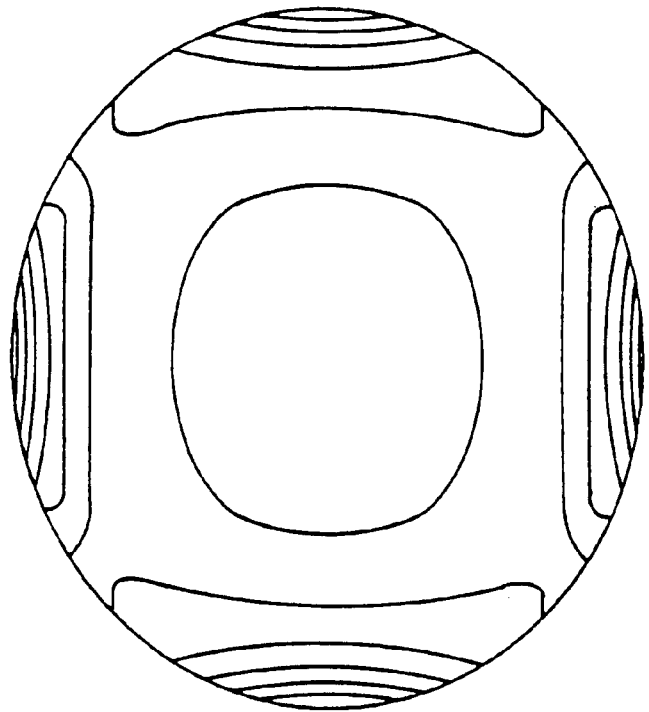
averaged torics
surface astigmatism
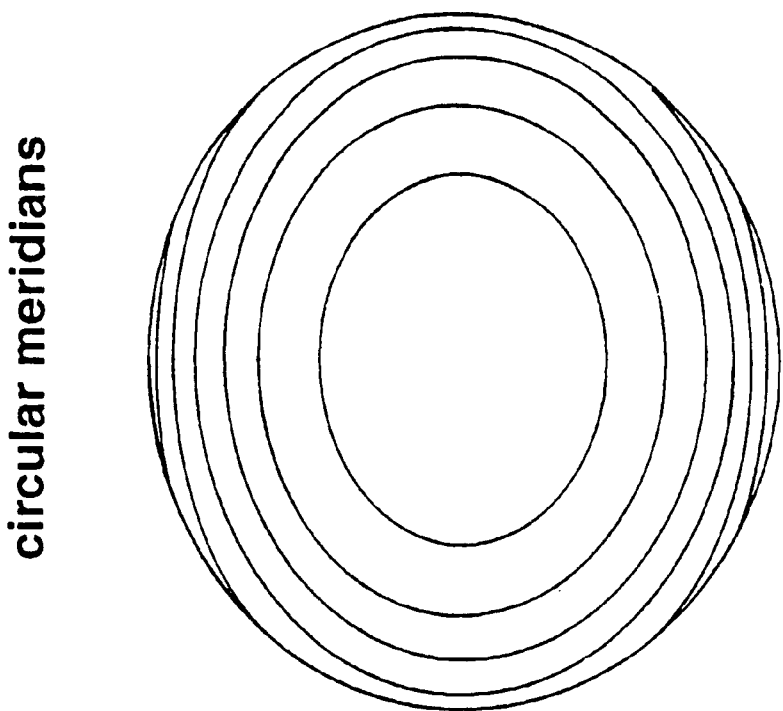
circular meridians surface astigmatism circular meridians
one extra coef.

Object Grid

Image through -5.00 Conventional lens

Image through -5.00 Distortion Corrected Lens

| | | |
|---|---|---|
| XL Progressive Rx=+2.00 D Distance Vision | 6 Base | Concentric Spherical Back |
| Mean Power Error | 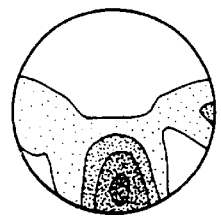 | 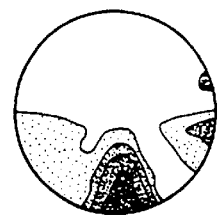 |
| RMS Power Error | 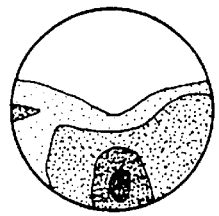 | 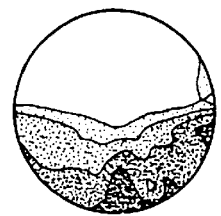 |
| Astigmatism | 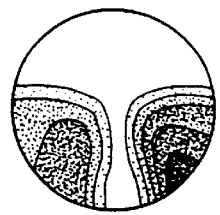 |  |
| Lens Form |  |  |
| Lens Data | Progressive Front Spherical back Front=6.00 D @ 1.530 Rx=2.00 D Index=Poly | Progressive Front Spherical back Front=16.0 D @ 1.530 Rx=2.00 D Index=Poly |
FIGURE 21

| | 6 Base | Concentric Spherical Back |
|---|---|---|
| XL Progressive Rx=+2.00 D Near Vision | | |
| Mean Power Error | 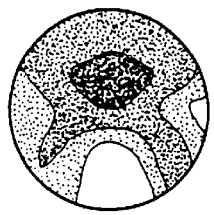 | 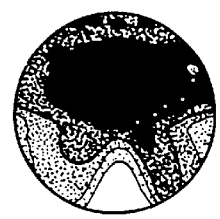 |
| RMS Power Error | 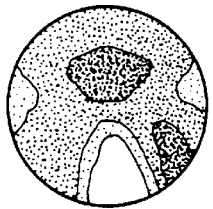 | 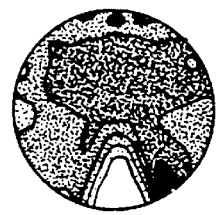 |
| Astigmatism | 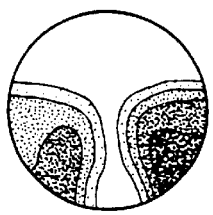 | 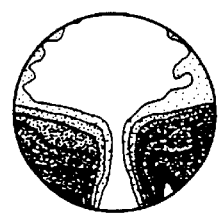 |
| Lens Form |  | |
| Lens Data | Progressive Front Spherical back Front=6.00D @ 1.530 Rx=2.00D Index = Poly | Progressive Front Spherical back Front=16.0D @ 1.530 Rx=2.00D Index = Poly |
FIGURE 22

WIDE FIELD SPHERICAL LENSES AND PROTECTIVE EYEWEAR

RELATED APPLICATIONS

This application is a continuation in part of U.S. application Ser. No. 09/658,496 entitled "Process for Molding Thermoplastic Lenses, and Steeply Curved and/or Thin Lenses Produced Thereby" to Kingsbury et al. filed Sep. 8, 2000 now U.S. Pat. No. 6,440,335. The '496 application is hereby incorporated by reference in its entirety.

This application and the '496 application are also continuations-in-part of U.S. application Ser. No. 09/223,006 filed Dec. 30, 1998 now U.S. Pat. No. 6,142,624, which application is hereby incorporated by reference in its entirety.

This application is also a continuation-in-part of International Application No. PCT/AU99/01029 to Yip et al. filed internationally on Nov. 19, 1999 with the U.S. as a designated state, published on Jun. 8, 2000 as WO 00/33111, which application is hereby incorporated by reference in its entirety.

FIELD OF THE INVENTION

The present invention relates to improved ophthalmic lens elements and eyewear, including prescription lenses, spectacles, sunglasses, laser protective eyewear, and frames, coatings and edgings therefor.

BACKGROUND

Most conventional prescription lenses have relatively flat base curves. Such lenses provide a limited field of view due to peripheral distortion and/or physical size limitations. Their relatively flat shapes limit the amount of eye protection afforded by the lenses, particularly near the temples.

Wrap-around eyewear has been developed in an attempt to provide wider fields of view and greater eye protection. Wrap-around design also permits different and sometimes striking overall styles for the eyewear. However, wrap-around eyewear is typically non-prescription. These products also typically have flat base curves between 6 and 10 D. Wrap (and sometimes rake) are achieved by rotating and/or translating the optical axes of the lens in the as worn orientation. See e.g. U.S. Pat. No. 1,741,536 to Rayton; U.S. Pat. No. 5,689,323 to Houston et al. This causes the line of sight of the wearer to deviate from the optical axis, and optical performance is often significantly degraded. Peripheral vision is typically poor.

Early in the history of ophthalmic science, steeply curved prescription lenses had been described, although not as vehicles for providing greater field of view or eye protection. A relationship between curvature and through power is shown in the so-called "Tscherning's" ellipse. First described nearly 100 years ago, it attempts to identify combinations of lens curvature and lens power which have minimum abberation. The general form of the Tscherning ellipse is shown in FIG. 1. FIG. 1 is given for assumed typical values for lens parameters such as index of refraction, vertex distance, lens thickness, etc. The Tscherning ellipse retains its ellipsoid shape and inclined orientation for various assumed values of lens parameters, while the precise location of points on the ellipse may change. The ellipse of FIG. 1 is derived from the corrected von Rohr equation (after Morgan) solved for point-focal (zero astigmatism) distance vision.

The lower portion 10 of the ellipse is the so-called "Ostwalt section" which describes a selection of relatively flat front surfaces for lens powers typically used in conventional prescription ophthalmic lenses. The upper portion 12 of the curve, called the "Wollaston section", describes much more steeply curved lenses which have never gained acceptance as lens forms, although there are historical instances of attempts to make such objects (e.g. Wollaston himself). See, M. Jalie, *The Principles of Ophthalmic Lenses* p. 464 ($4^{th}$ Ed. London, 1994). Because of difficulties in fabrication, such early lenses were probably of small aperture and, consequently, perhaps, regarded as unacceptable for cosmetic reasons and because of their limited field of view.

Modern lenses with steeply curved front spherical surfaces have been made for the treatment of aphakia (absence of the natural lens of the eye as in the case of surgical removal of the lens). The general form of these lenses is shown in FIG. 2. See M. Jalie at p. 151. Such lenses serve essentially as an eye lens replacement and are characterized by great thickness and high plus power (greater than +5 D and typically +12 D or greater). The aperture A of these lenses are of small size e.g. 26 or 28 mm in diameter. Typically such aphakic lenses have a plano radial flange 14.

Today, the vast majority of conventional prescription lenses are relatively flat, single vision, Ostwalt section, miniscus lenses which are glazed like window panes into flat outline spectacle frames.

Conventional Ostwalt section eyewear is sometimes covered, treated or coated to provide specific reflective or anti-reflective properties. Most familiar are sunglasses which provided with coatings for selectively blocking portions of the incident light spectra. Some such lenses are designed to create pleasing colors to an observer by selective selection or absorption of incident spectral wavelengths. Such coating may involve metallic mirror layers and/or stacks of vacuum evaporated or sputter coated metal oxides. For example, coating for sunglasses are disclosed in U.S. Pat. No. 2,758,510 to Aüwarter. As another example, certain multi-layer antireflection coatings are disclosed in U.S. Pat. No. 4,070,097 to Geller. See also U.S. Pat. Nos. 5,719,705 and 5,959,518. Conventional Ostwalt section lens are also sometimes specially coated to protect the wearer from intense ultraviolet or infrared radiation, or from laser beams.

OBJECTS AND ADVANTAGES OF THE INVENTION

Applicants have studied the properties of steeply curved lenses and considered series of lenses having commonly prescribed plus or minus through powers. Applicants observed that such lenses could, in principle, provide a wide field of view and eye protection. However, certain problems would interfere with practical implementation of such wide-field lens. Generally there are problems of fabrication and distortion, and problems of producing a range of common plus or minus power prescriptions with or without available common astigmatism correction or "cyl" prescriptions.

A more subtle problem is presented by the wide range of front surface powers which would be required to provide a range of common prescription powers. For the lens assumptions of FIG. 1, for example, the Wollaston section would be understood to teach a variation in front surface power of from about 15 D to about 20 D for a product line through-power range of from +5 D to −8 D. This corresponds to a variation in radius of front surface curvature of from about 29 to about 39 mm, which represents a large variation in overall size and shape for lenses large enough to provide a wide field of view. Such lens cannot be fitted like panes into a single frame size, but, in fact, each prescription itself would dictate its own specialized frame size and style. While such unique styles have value, they are incompatible with providing mass-marketed eyewear with a consistent appearance.

A broad object of the present invention is to provide ophthalmic lenses with good vision properties.

It is another object of the present invention to provide a series of steep base curve lenses which are readily manufactured and dispensed.

It is another object of the present invention to provide an ophthalmic lens having good vision properties through a wide field of view.

It is another object of the present invention to provide a steeply curved lens with reduced distortion in peripheral regions.

It is another object of the present invention to provide eyewear which affords more effective eye protection.

It is another object of the present invention to provide steeply curved lenses in common power and astigmatism prescriptions.

It is another object of the present invention to provide eyewear for steeply curved prescription lenses with a consistent appearance and frame configurations for a range of prescriptions.

Certain additional advantages may be realized through the teachings of the present invention. The increased field of view allows the making of eyewear whose temporal edge is not visible to the wearer (apparent edgelessness). The teachings of the present invention also permit reduction of magnification effects and associated distortion in some steeply curved lenses.

Other advantages involve providing the eyewear designer with options heretofore unattainable in lens having good peripheral vision properties in various prescriptions. These include the ability to use smaller outline lenses, topologically and cosmetically interesting three-dimensionally curved lens edges and spectacle rims, and edge thicknesses and surfaces which are more readily hidden from view.

Other advantages involve the provision of novel sun lenses and protective eyewear tailored to provide certain desired cosmetic properties and certain reflectance and anti-reflectance properties.

These and other objects and advantages will be apparent from the following text and drawings.

SUMMARY OF THE INVENTION

Generally, the present invention relates to eyewear and ophthalmic lens elements therefor. Ophthalmic lens elements may include, according to context, finished or edged ophthalmic lenses, semi-finished lenses, lens blanks or molds therefor. Also included are wafers for forming laminated lenses or lens blanks The present invention is exemplified with reference to FIG. 3 which illustrates some geometric aspects of the steeply curved, concentric lenses of the present invention. FIG. 3 shows a horizontal cross-section of left and right eyes (20 and 22 respectively). Each eye is shown having a centroid of rotation, 24 and 26. The centroid of rotation may be understood as a volume within the eyeball, having a diameter $C_D$ of roughly 1–2 mm, about which the eye appears to rotate as the direction of gaze varies. As shown in FIG. 3, left and right steeply curved lenses 28 and 30 are positioned about the eye. In the Figure, the optical axis of each lens is co-linear with the line of sight of each eye and represented by the lines 32 and 34 for each eye. These lines also represent the z axis of coordinate systems later used in the text to describe certain lens surfaces (the x-y plane being normal to the plane of the Figure).

The lenses 28 and 30 are generally describable as spherical or spherically based. In preferred embodiments, the front surface is spherical, having a fixed radius of less than 35 mm for all prescription values in the series. In other embodiments, the lens is best described as having a spherical back, as containing a reference sphere or as lying within a defined spherical shell. In each case the radius of the reference sphere or shell and the location of the lens as worn is such that the center of the reference sphere or shell lies close to or within the centroid of rotation of the eye. The case in which the front surface is a sphere of radius R centered on the centroid of rotation of the left eye is illustrated for the left eye in FIG. 3.

The selection of a spherical base of a given radius centered on or near the centroid of rotation of the eye, places a constraint on the vertex distance $d_v$, illustrated for the left eye of FIG. 3 as the distance between the plane of the pupil 36 and the back surface 38 of the lens. Front surface radius and back surface shape, in conjunction with other design parameters such as the lens thickness and the index of refraction of the lens material determines the optical properties of the lens as described in detail below.

Applicants have found that the lens design of the present invention may be analyzed and described by a data array of a type illustrated in FIG. 4. The diagram is called a "Morris-Spratt" diagram after two of the inventors.

In the diagram, each dot is at the center of a theoretical ray-trace plot from a lens having properties of the grid point at the center of the dot. The "y" axis on the right gives the power of the front surface of the lens in diopters (normalized for an index of refraction of n=1.530). The "x" axis at the bottom shows the through power of the lens at its center. This corresponds to the plus or minus power prescription of the lens. For this Figure it is assumed that each lens is made of polycarbonate (n=1.586) and has a center thickness of 1.8 mm in minus power lenses, and a center thickness in plus lenses determined individually for each prescription so that the minimum overall lens thickness is 1 mm in the periphery of a 58 mm diameter lens blank. Each lens is positioned relative to the eye such that the front surface is 33.1 mm from the centroid of rotation of the eye, which is concentric for lenses which have a front surface power of 16.0 diopters.

At each individual grid point appears a ray trace result for eye rotation angles up to 40 degrees. The dark area at each grid point represents the region of each lens that has less than 0.125 diopters of RMS power error relative to the prescription and allowing up to 0.375 diopters of accommodation. RMS power error is defined mathematically below. This criterion is believed to be a good indicator of lens performance.

The fully filled-in circles in FIG. 4 represent lenses with less than 0.125 diopters of RMS power error over 40 degrees of eye rotation in any direction. For dots with rings around them, the RMS power error rises above 0.125 diopters for some intermediate eye rotation angles then drops below that threshold again for some small angular region.

The elliptical outline of the locally largest dots corresponds roughly to a Tcherning's ellipse generated for the special case of the lens parameters selected by applicants. Conventional wisdom dictates that the front surfaces of spherical lenses (lenses with spherical surfaces on the front and back) must follow Tcherning's ellipse to produce high quality lenses. However, the Morris-Spratt diagram illustrates that for appropriate selection of lens parameters there is a nearly horizontal region in this diagram where it is possible to produce excellent lenses. It is known that plano spherical lenses with high quality optics can be fabricated extending over a wide range of front surface curvatures (a fact that indicated by the vertical line of large dots near zero through power). Many such lenses are available in the market today. The novel idea that is illustrated in the Morris-Spratt diagram is that is it also possible through appropriate selection of lens parameters to fabricate high quality spherical lenses over a wide range of prescriptions using a single, steeply curved front surface or spherical reference surface or shell. Notice that the low RMS power error regions for lenses using a front surface power of 16 diopters (grid points on line 40) have wide angular extent (nearly full or full circles) over a range of at least −6 to +4 diopters. Over 95% of all prescriptions fall within this range. Therefore, it is possible to produce high quality ophthalmic spherical lenses over a wide range of useful prescriptions using a single, appropriately selected high power front surface or base curve. Moreover, as made clear by FIG. 4, some small deviations from the single power or from exact concentricity may be made while providing good lens quality and a lens shape sufficiently consistent to use the same frame style.

FIG. 5 illustrates a series of good optical quality lenses of a preferred embodiment of the present invention. In this embodiment, the front surface is selected to be about 16 D±about ½ D. This range lies between lines horizontal 50 and 52. Particularly preferred embodiments provide series of lenses having prescription in the range −2 D to +2 D (area 54), −6 D to +4 D (areas 54 and 56), or −8 D to +5 D (areas 54, 56 and 58).

For comparison purposes, a portion of the Wollaston section of the Tscherning ellipse 60 for this special case has been overlaid on the diagram of FIG. 5. The Figure shows that the front curve and through power ranges represented in the horizontal blocks are inconsistent with the Tscherning ellipse teaching which would indicate a 5 D variation in the front surface for −8 D to +5 D through power and a far steeper curvature in the center of the through power range.

Preferred embodiments of the present invention include series of lens elements defined by a single reference sphere concentric with the centroid of rotation of the eye of the wearer, where the sphere has a radius of curvature in the range of 25 to 50 mm, more preferably 30 to 35 mm and most preferably about 33 mm±about 1 mm.

Advantageously, the series of lens elements are provided with the appropriate prescribed power and cyl correction. In the embodiment where the front surface is spherical, the back surface is configured to provide the appropriate through power and cyl correction. In a preferred embodiment, a series of lens elements would include through power through the above-mentioned ranges in ¼ D increments. Stock lens elements of each power would be provided with each of various common astigmatism prescriptions, for example, 0 D to −2 D in ¼ D increments. It will be understood that because of the spherical symmetry of the lens element, the angle of the cyl correction can be selected by appropriate rotation of the lens element during edging and glazing.

Conventional astigmatism correction is based on toroid surfaces often described in terms of principle meridia, i.e. orthogonal meridia centered at the optical axis of the lens, representing the locus of maximum and minimum curvatures. Barrel toroids and donut toroids have both been used to provide cyl corrections. As described below, applicants have developed novel astigmatism correcting surfaces for steeply curved lens, which surfaces can be described as lying between a barrel toroid and donut toroid each having the same principle meridia and the same power along the principle meridia. Two such surfaces are the "all-circular meridia" surface and the "averaged-toroids" surface described in detail below.

The shape of lenses of the present invention will now be described. The term "steep curvature" is used in this context to describe the overall shape of the lens or reference sphere or shell. In particular examples the curvature may be quantified as an average radius of curvature of a surface or of a spherical shell lying inside or outside the lens or containing a surface of the lens.

Lenses of the present invention are also characterized in general shape by their large angular field of view, often expressed as an angle between the optical axis and the temporal-most or nasal-most extremes of the edges. In accordance with preferred embodiments of the present invention, the lens subtends an angle centered on the center of a front spherical surface, the angle being greater than 80° and in preferred embodiments greater than 100°. It will be understood that such angles are indications of the field of view of the lens provided of course that the lens is optically usable in these peripheral regions.

The unique topological shape of the lenses of the present invention may also be characterized by sagittal depth or "hollow" depth, which are generally a measure of the three-dimensionality of the lens and lens edge. These depths relate to the distance between the fronto-parallel plane of the lens and the temporal most edge point, as described below. In accordance with preferred embodiments of the present invention, there are provided lenses with an average radius of no more than 50 mm centered on the centroid of rotation of the eye and having a hollow depth of at least 8 mm. In a particularly preferred embodiment the radius of the front surface is about 33 mm±about 1 mm and the hollow depth is at least 10 mm.

The present invention also includes methods for providing prescription eyewear. These methods employ lens elements having a steep curvature. Preferred embodiments employ a front surface which lies within a spherical shell of a thickness no greater than 2 mm and a radius of no more than 50 mm. A rear surface is formed in the lens element so that the lens element has a prescribed through power and a prescribed astigmatism correction. The lens element is positioned on the wearer so that the center of the spherical shell lies at or near the centroid of the eye by glazing into a frame having a standard aperture corresponding to a radius of a spherical shell common to a series of lens elements having different through power, including the prescribed through power. The eyewear provides the prescribed power and astigmatism correction through the wearer's entire visual fixation field.

The present invention also includes specially designed spectacle frames. In a preferred embodiment the spectacle frame is suitable for use with a series of ophthalmic lenses, each having a spherical surface of a single radius between 25 and 35 mm, and a second surface selected to provide in conjunction with the spherical surface various common prescriptions. In preferred embodiments the frame is adapted to support left and right lenses on the wearer so that the centers of the spherical surfaces are located at or near the centroids of rotation of the left and right eyes, respectively. The spectacle frame may include temple pieces and rim portions for engaging the left and right lenses. The rim portion engaging each lens may be formed in the shape of a closed curve lying on a reference sphere having a radius approximately equal to the radius of said spherical surface. In such spectacle frames, the nasal-most point and temporal-most point of the closed curve may subtend an arc of greater than 90° with a vertex at the center of the spherical surface.

The spectacle frames may include a left temple piece, a right temple piece and a nose bridge. In a preferred embodiment the nose bridge is of adjustable length to allow horizontal adjustment of the lens separation to position the centers of the spherical surfaces at the centroids of the eyes. In other embodiments, rimless frames are provided with novel fitments and hinges for supporting temple pieces, the hinges being adapted for direct attachment to the reference spherical surface at the temporal edges of the respective lens.

The present invention also includes novel lens edging which may be used with steeply curved lenses particularly those having at least one spherical surface with a radius of curvature between about 31 mm and 33 mm.

In such a case the lens may be edged so that an edge surface of the lens is approximately normal to the spherical surface of the lens. Eyewear made with such lenses may be rimless and the edge surface may be essentially invisible to the wearer because the edge surface lies approximately on the wearer's line of sight when his gaze is cast in that direction. In addition, the appearance of the edge to an external observer is minimized. Such edge surfaces may be generated by a mill rotated about an axis which intersects the center of curvature of the spherical surface. In preferred embodiments, the edge surface is cut so that it subtends a small arc with respect to the center of curvature of the spherical surface where the arc lies in any plane which contains the optical axis of the lens.

The present invention also includes methods for making steeply curved lens elements adapted for mounting in eyewear. The method may involve molding a lens blank having a radius of curvature along a principle meridian of less than 35 mm over a substantial portion of its front surface. After molding a back surface is cut on the molded lens blank, which, together with the front surface, provides a non-zero prescription through power. Finally, the lens blank is edged to provide an edged lens having a maximum hollow depth of at least 8 mm. The cut back surface together with the front surface may be designed to provide a non-zero astigmatism correction for the wearer.

In one embodiment, progressive surface power addition is molded on the front of the lens blank. Alternatively, the progressive surface power addition may be incorporated in the back surface cut in the lens blank.

Other aspects of the present invention relate to steeply curved sun lenses such as the lenses with a spherical optical surface with a radius of curvature less than 35 mm described above. The suns lenses are made by coating and/or dying the steeply curved lenses of the present invention. In a preferred embodiment, an optical surface (for example the front surface) may be coated with a partially reflective dielectric stack which, in a particularly preferred embodiment, is generally blue in color. The surface coating may be a sputter-deposited multi-layer coating made up of alternating layers having relatively high and relatively low refractive indices. In particular the surface coating may be a stack of silicon and zirconium oxide layers, at least one of the zirconium oxide layers being greater than about 10 nm in thickness. The coating is designed so that its reflectance begins to decrease for incident light of a wavelength above about 480 nm and remains relatively low into the near infrared region.

The present invention also relates to protective eyewear including left and right lenses each having a spherical surface. Each spherical surface preferably has a radius of curvature between about 31 mm and 35 mm. Frames support the lenses on the face of the wearer so that the center of the spherical surface of each of the left and right lenses is located approximately on the centroid of rotation of the left and right eye, respectively.

Multilayer coatings may be formed on each lens for at least partially blocking transmission to the respective eye of radiation incident on the lens. The layers have selected refractive indices and thicknesses for at least partially blocking at least one selected portion of the spectrum of incident radiation. In sun lens embodiments, ultraviolet light may be at least partially blocked. Protection from laser radiation may also be provided by the eyewear in industrial or military settings. In this case coatings and/or dyes are provided to block laser light in a selected spectral range. In particular, infrared laser radiation may be at least partially blocked. Incident laser radiation is blocked sufficiently to reduce its power level to eye safe level. Off-axis incident radiation is blocked by the stack, absorbed by a dye and/or has an optical path which does not reach the retina.

In the protective eyewear embodiments of the present invention, advantageously each lens extends from the nasal margin of the orbital region to the temporal margin of the orbital region and from the lower to the upper margins of the orbital region, so as to stand between incoming radiation from all directions which would reach the retina, while affording the wearer a wide field of view.

The foregoing is intended only as a summary of the invention, the scope of the invention being determined by the literal language of the claims and equivalents thereof.

BRIEF DESCRIPTION OF THE DRAWINGS

FIGS. 10(a), 10(b), 10(c) and 10(d) present a comparison of fields of view for an example of a 6 base conventional lens and a lens and lens element of the present invention;

FIGS. 12(a)–(d) are graphs of tangential and sagittal surface power as a function of a polar angle for the donut and barrel torics of FIG. 11;

FIGS. 13(a), 13(b), 14(a) and 14(b) are graphs of tangential and sagittal surface power as a function of polar angle for the all-circular meridia and the averaged toric surfaces of the present invention;

FIGS. 15 and 16 are contour plots of surface astigmatism for lens element surfaces employing the teachings of the present invention;

FIGS. 21 and 22 are contour plots comparing a conventional 6 D base progressive lens, with a 16 D base progressive lens in accordance with the present invention;

FIGS. 23, 24, 25 and 25(a) illustrate various aspects of the appearance, edging, and glazing of lens elements of the present invention and spectacle frames for use therewith;

DETAILED DESCRIPTION OF DRAWINGS AND EXAMPLES

Outline

I. Basic Lens Geometry.
II. Correction Of Astigmatism.
III. Reduction Of Magnification Effects And Distortion.
IV. Lens Manufacture.
V. Calculated Performance Of Lens Design Examples.
VI. Glazed Lenses And Spectacle Frames.
VII. Coatings, Sun lenses and Protective Eyewear.

I. Basic Lens Geometry

Figure 6:
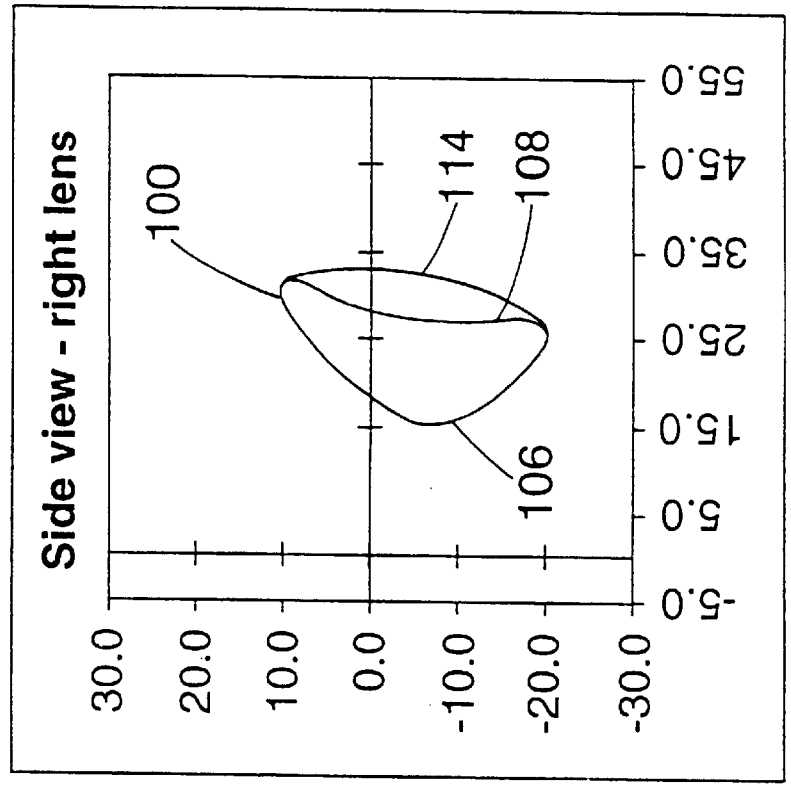
FIGS. 6(a), (b) and (c), 7, 8 and 9 are schematic diagrams illustrating various aspects of the geometry of lens elements of embodiments of the present invention.
Figure 6:
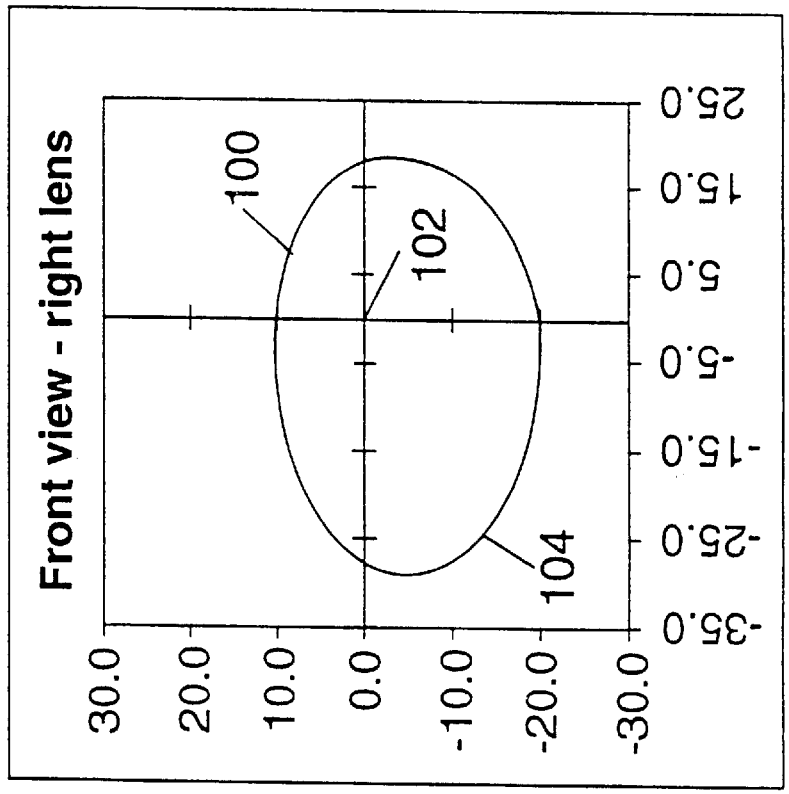
Figure 6:
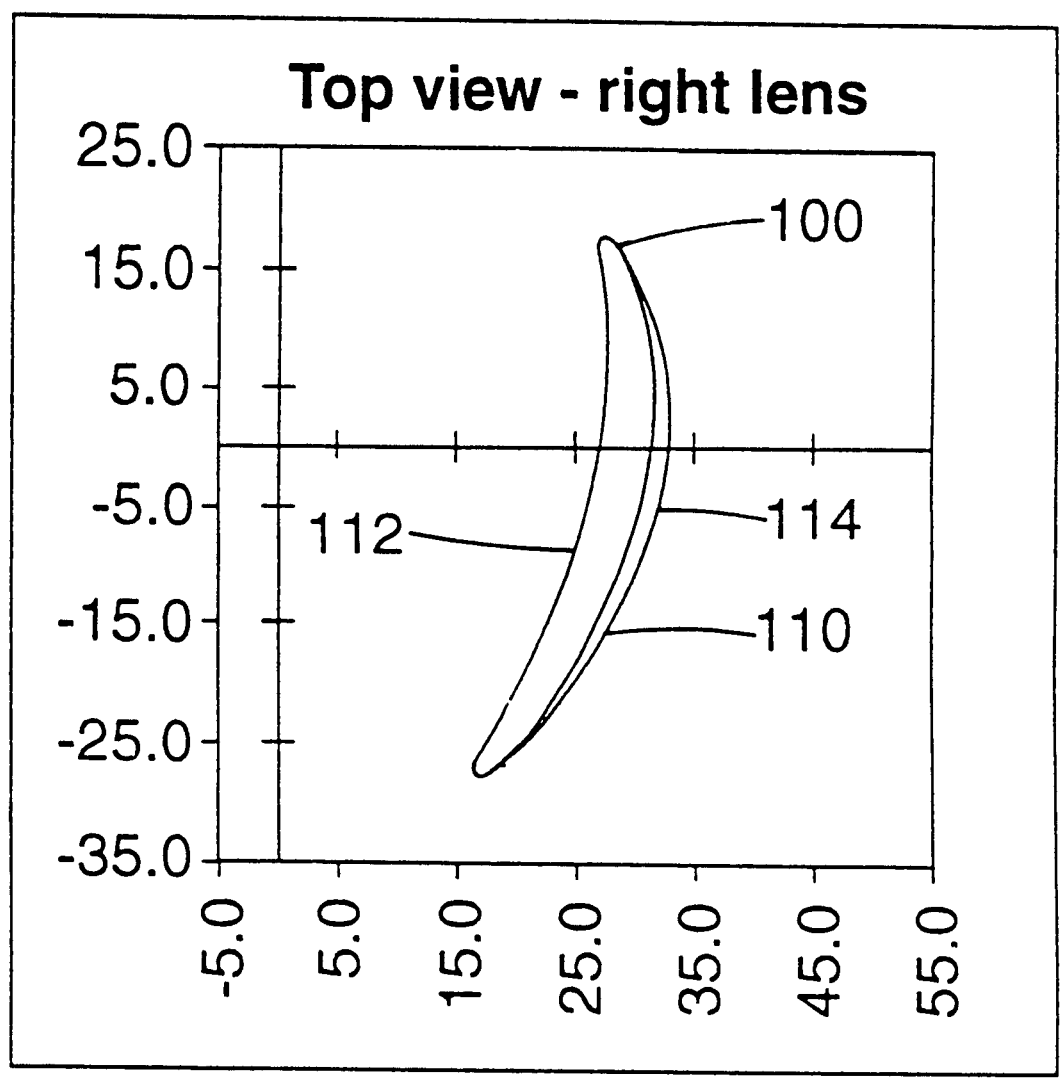

The basic geometry of lenses made in accordance with the present invention will first be discussed. FIGS. 6(a), 6(b) and 6(c) illustrate, respectively, front, side and top views of an edged lens 100 in accordance with the present invention. The origin 102, in FIG. 6(a), is the location of the optical center of the lens and the design location of the center of the pupil when worn. The outline 104 of the edged lens is indicated from a front view perspective in FIG. 6(a). In FIG. 6(b) the temporal edge 106 and nasal edge 108 of the lens are shown. In FIG. 6(c) the upper edge 10 and lower edge 112 of the lens are shown. In the lens embodiment of FIG. 6, the front surface of the lens is a steep spherical curve, the right-most extent of which is indicted by the line 114.

The steeply spherical curvature of embodiments of the present invention can be designed into the lens in a variety of ways. In the preferred embodiment, discussed above, the front surface of the lens elements is a single radius sphere centered at or near the centroid of rotation of the eye. Alternatively, the back surface of the series of lens elements may be a constant steeply spherical surface and centered at or near the centroid of rotation. In these embodiments the other surface is of variable curvature, the curvature being selected to provide at least the appropriate through power for the wearer. For example, if a 16 D spherical front surface is selected for the lens element series, a rear surface with a curvature of 20 D on its major meridian and 18 D on its minor meridian may be used to provide a −4 D through power with a −2 D cyl. Alternatively, if the constant radius surface of the lens element is placed on the back surface, then the corresponding surface selected for the particular prescription may be placed on the front surface.

Figure 7:
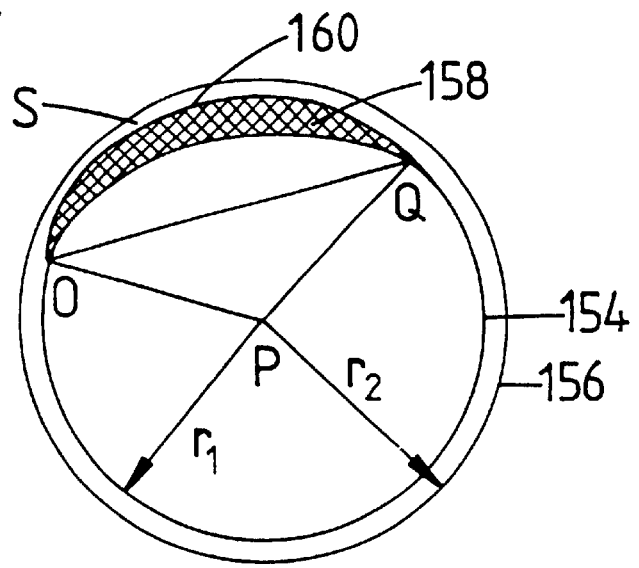

In other alternatives, the lens element or a surface is constrained to lie within a spherical shell. This geometry is illustrated in FIG. 7. Two concentric spheres, 154 and 156 are defined by a center at Point P and two radii $r_1$ and $r_2$ where $r_2 > r_1$. Together, the spheres define a shell S. A lens 158 is shown having a nasal-most edge point Q and a temporal-most edge point O. A front surface 160 of the lens lies within the shell S.

A front surface of the optical lens element according to the present invention may be a spherical, toric or rotationally symmetric aspheric surface. In order to improve vision further, the front and/or back surface of the optical lens element according to the present invention may deviate from a spherical form to provide improved optical performance and/or cosmetic appearance. The front and/or back surface, as described above, may be derived by the solution of the optimization problem to minimize a selected merit function representing a measure of optical abberations seen by the wearer of the lens. The correction may alternatively, or in addition, improve the cosmetic appearance of the lens element. Alternatively the surface within the shell may be a multi-focal progressive lens as described in greater detail below.

In a preferred embodiment, the lengths of radii $r_1$ and $r_2$ differ by no more than 2 mm, and in a more preferred embodiment one of the radii is about 33 mm and the difference in the lengths of the $r_1$ and $r_2$ is about 0.1 mm or less. The front surface subtends an angle OPQ greater than 75°, preferably greater than 90° and more preferably greater than 100°. This angle is a measure of the wide field of view provided by the lens.

Alternatively, the lens may be defined to lie entirely within a shell defined in a manner similar to the shell S of FIG. 7, where the difference in length of $r_1$ and $r_2$ is less than 6 mm.

Additionally and alternatively, the lens may be defined as containing a portion of a steeply curved sphere such as the portion OQ of the sphere having radius $r_1$ in FIG. 7. The reference sphere may be a sphere which lies intermediate the front and back surfaces of the lens element. In embodiments of the present invention this steeply curved sphere may define abutting surfaces of two lens wafers otherwise made in accordance with U.S. Pat. No. 5,187,505 which is hereby incorporated by reference. In such a case the ophthalmic lens or lens blank is formed as a laminate of back and front wafers. Because the abutting surfaces of the wafers are spherical, it will be understood that the wafers may be rotated to achieve the desired orientation of a cyl correction applied to one of the surfaces. This is particularly useful in providing progressive lenses.

Figure 8:
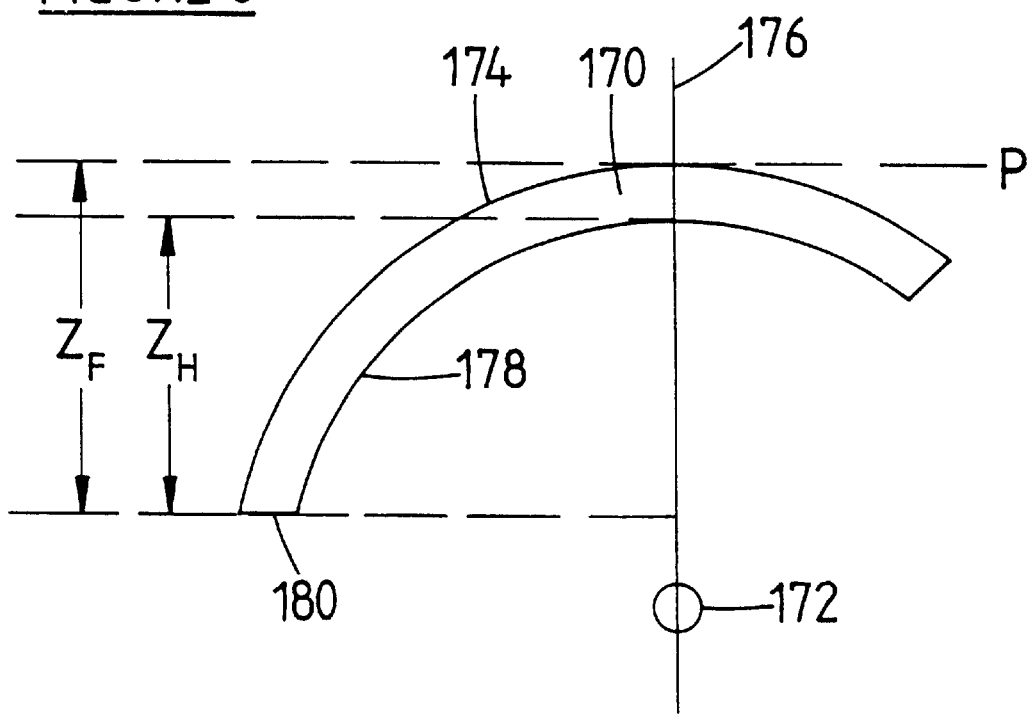

Other aspects of the novel geometry of the lens elements of the present invention are illustrated in FIG. 8. A lens 170, with a steep spherical curvature, approximately concentric with the centroid 172 of rotation of the eye, is shown. The fronto-parallel plane P is tangent to a spherical front surface 174 of the lens. The optical axis 176 of the lens is normal to the plane P and passes through the centroid of rotation of the eye. A back surface is identified by the numeral 178. The lens extends in a temporal direction to a temporal edge 180. The novel geometry of the lens is defined in part by a hollow depth $Z_H$ which is the perpendicular distance between the back surface 178 of the lens at the optical axis and the edge 180. A related dimension $Z_F$, is the distance between the fronto-parallel plane P and the edge 180.

Figure 9:
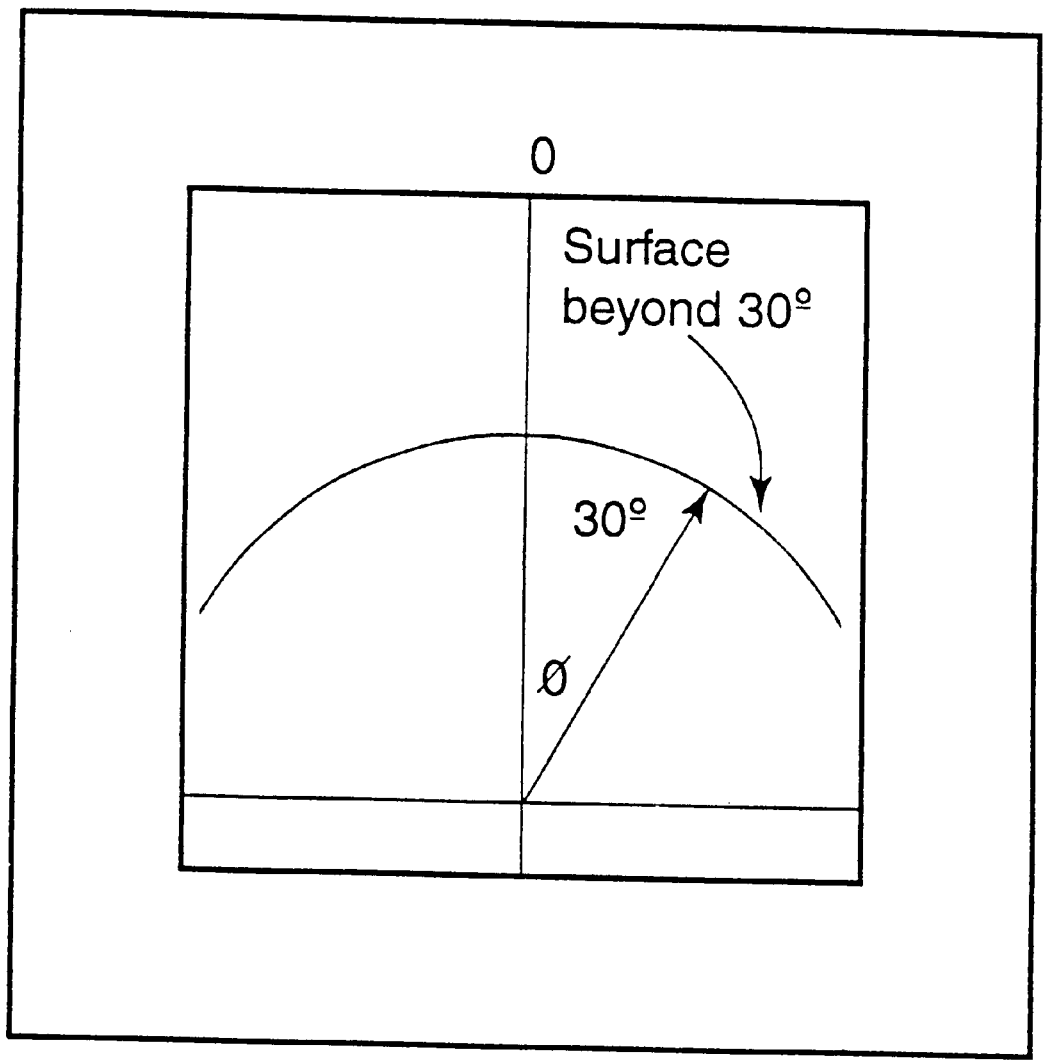

It is instructive to consider the peripheral optical properties of the lenses of the present invention, such as distortion. In such cases, reference may be made as shown in FIG. 9 to lens properties lying inside or outside of a cone of half angle φ centered on an optical axis O. In FIG. 9, θ is shown as a 30° angle. In preferred embodiments of the present invention, the lens element of the series has a surface astigmatism of less than 0.125 D through a cone defined by an angle θ of at least 25°.

A lens element of the present invention may be such that for foveal vision the RMS Power Error (defined below) is less than ⅜ D for eye rotation angles less than 30°. Moreover the lens element may be such that for foveal vision the RMS Power Error is less than ½ D for eye rotation angles greater than 30° and less than 40°. Finally, the lens element may be such that for foveal vision the RMS Power Error is less than ¾ D for eye rotation angles greater than 40° less than 50°.

In preferred embodiments, the lens element may be configured such that for peripheral vision where the eye is rotated and fixated at an angle of 30° temporally the RMS Power Error is less than ⅜ D for angles ±5° of the fixed position; the RMS Power Error is less than 0.65 D for angles ±10° of the fixed position; and the RMS Power Error is less than 1.0 D for angles ±30° of the fixated position.

Certain features of the present invention and a comparison with a conventional lens are illustrated in FIG. 10. FIG. 10(a) illustrates a plan view outline selected for a conventional lens and a steeply curved spherical lens of the present invention. A conventional 6 D base lens 200 is shown in FIG. 10(b) and a 16 D base lens 202 in accordance with the present invention in FIG. 10(c), both having the same plan outline as in FIG. 10(a). The apparent field of view is measured between edge rays centered on the center C of the pupil in the pupillary plane. The conventional base 6 lens 200 has an apparent field of view of about 105° while the lens 202 has an apparent field of view of about 130°. If a larger lens blank and plan outline are employed, a 16 D base lens 204 of the approximate size of FIG. 10(d) may be produced. Such a lens may extend horizontally from the nasal margins 206 to the temporal margins 208 of the orbital region producing an apparent field of view of about 170°. Such a lens would have no temporal edge which could be seen by the wearer when gazing straight ahead. Moreover, the temporal lens edge thickness 210, would not be readily observed by other people because it curves in a posterior direction, thus improving the cosmetic appearance of the lens. Finally, the rear surface 212 of the lens would clear eyelashes of normal length for a broad range of prescriptions.

II. Correction of Astigmatism

Steeply curved spherical lenses in accordance with the present invention present particular problems when a cyl correction is part of the wearer's prescription. Common toric back surfaces may not provide acceptable performance. In particular, conventional torics do not work very well at the periphery of steeply curved lenses.

The ideal back surface for a cyl Rx (neglecting things like ray obliquity) would have a constant surface astigmatism appropriate for the prescription. No such surface exists. Toric surfaces are a manufacturable approximation to this ideal. There are two standard types of toric surfaces, sometimes referred to as donut torics and barrel torics. Each is made by sweeping a circular arc around a fixed axis. If the radius of the circle is smaller than its maximum distance to the fixed axis then it is a donut toric, otherwise it is a barrel toric. Both types of torics have circular cross sections along the two principal meridians. Because of this (and symmetry) the tangential power is correct everywhere along these meridians. In addition each type of toric has a "preferred" meridian where the sagittal power is correct. For the donut toric it is the lower tangential power meridian, for the barrel toric it is the higher tangential power meridian. Zero tangential and sagittal errors means the surface astigmatism is identically zero along the preferred meridian.

Figure 11B:
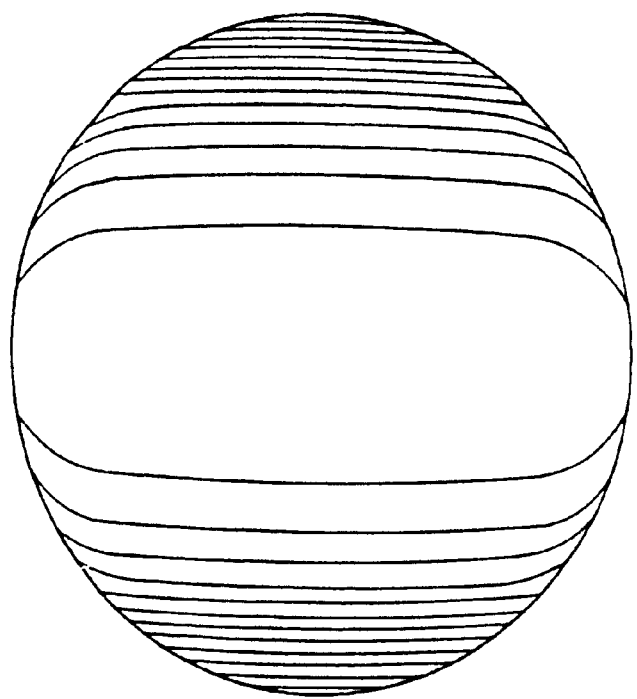
FIGS. 11(a) and (b) illustrate surface astigmatism of a conventional donut and a barrel toric when imposed on a steeply curved spherical lens having principle meridia shown in FIG. 11(c)
Figure 11A:
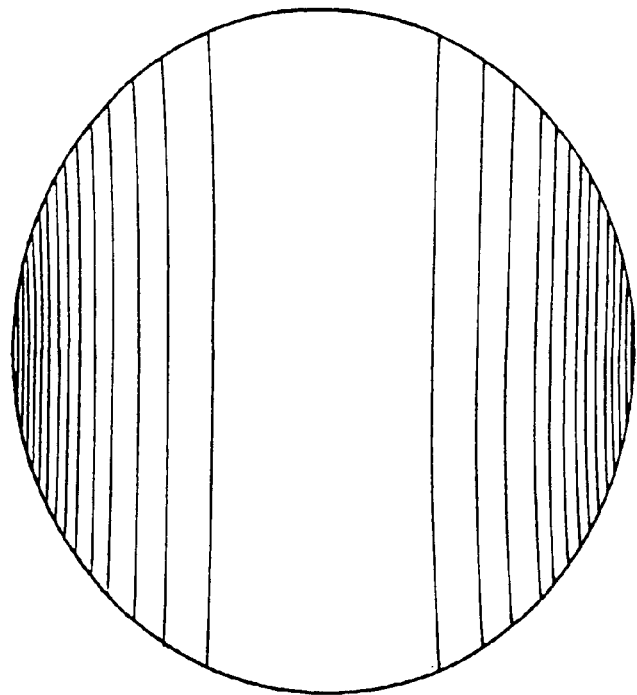
Figure 11C:
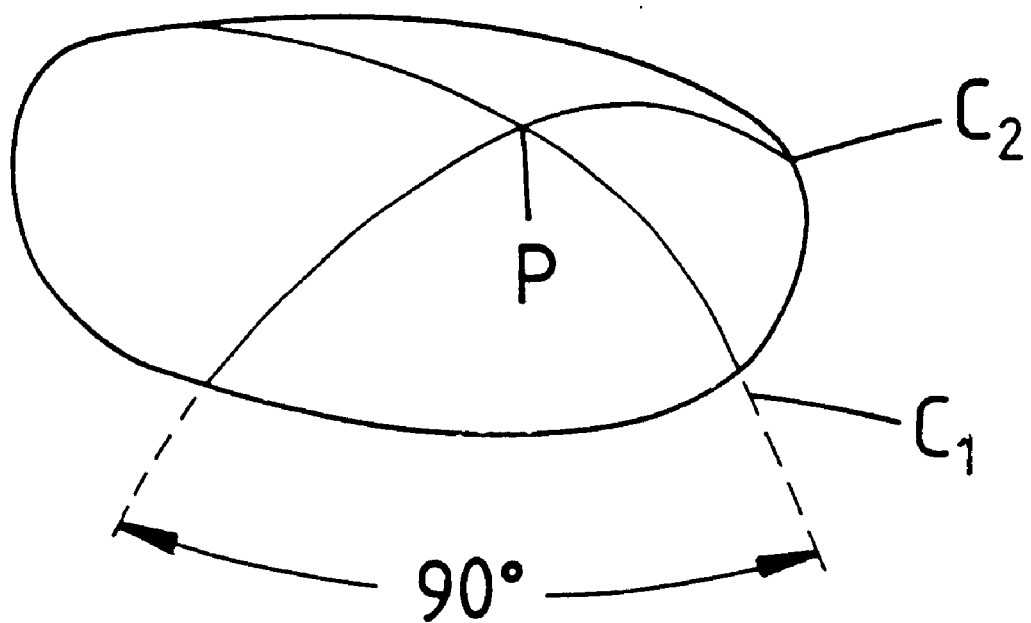
Figures 12C, 12D:
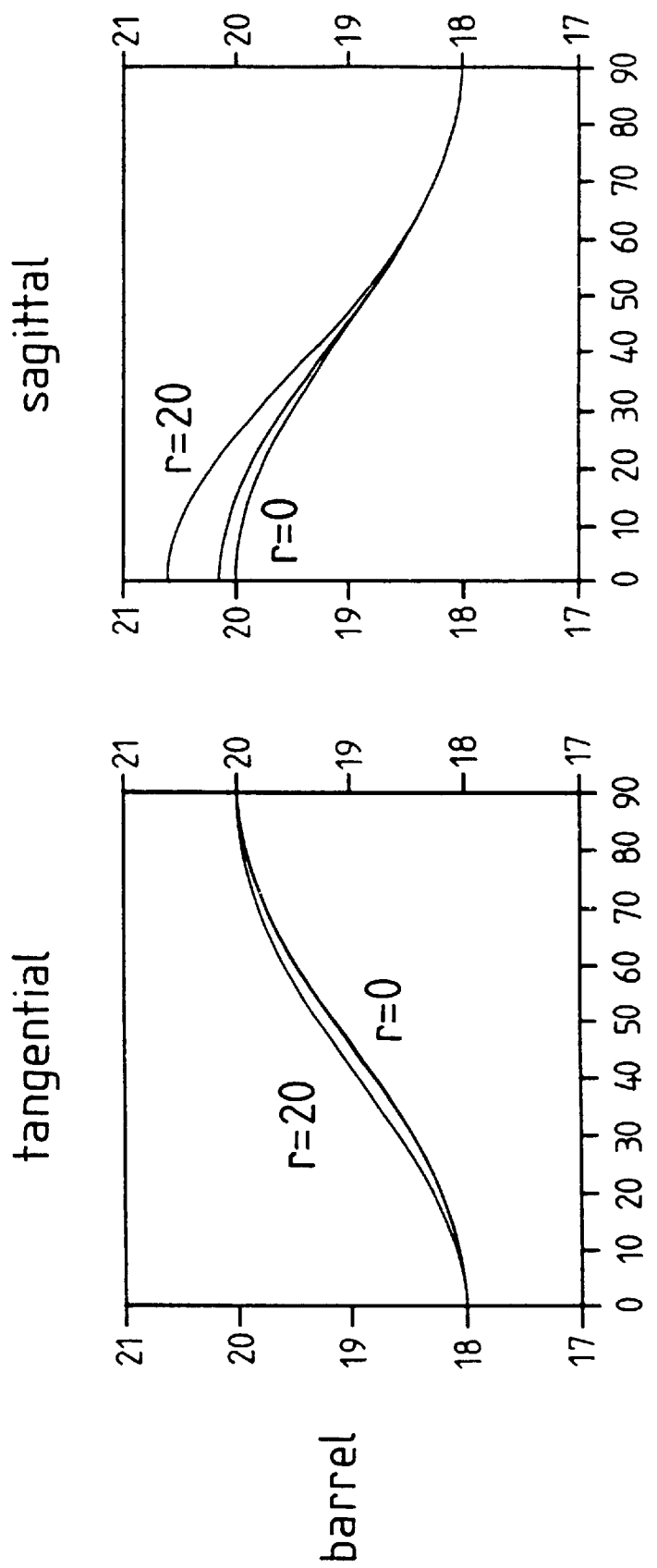

Examples of conventional torics in steeply curved lenses are shown in FIGS. 11(a) and (b). Both examples have a tangential power of 18 diopters (@n=1.530) on the equatorial 180 degree meridian and 20 diopters at 90 degrees, for a nominal 2 cyl. The plots are 45 mm in diameter and have 0.1 diopter contours. Circular principle meridional curvatures C1 and C2 are shown pictorially in FIG. 11(c). C1 and C2 intersect at a central point at the pole P at an angle of 90°. It will be understood that other "non-principle" meridia may be defined radiating from the central point.

The preferred axis is obvious from the plots of FIG. 11. The tangential and sagittal surface power for angles 0 to 90 degrees around radii 0, 10, and 20 mm from the center are shown in FIGS. 12(a)–(d).

From the Figures it may be noted that the donut and barrel torics both have the correct tangential power at 0 and 90 degrees for all radii. The donut toric has the correct sagittal power at 0 degrees, but an error at 90 degrees that increases with radius. The barrel toric has the correct sagittal power at 90 degrees and errors that increase with radius at 0 degrees.

Figure 13B:
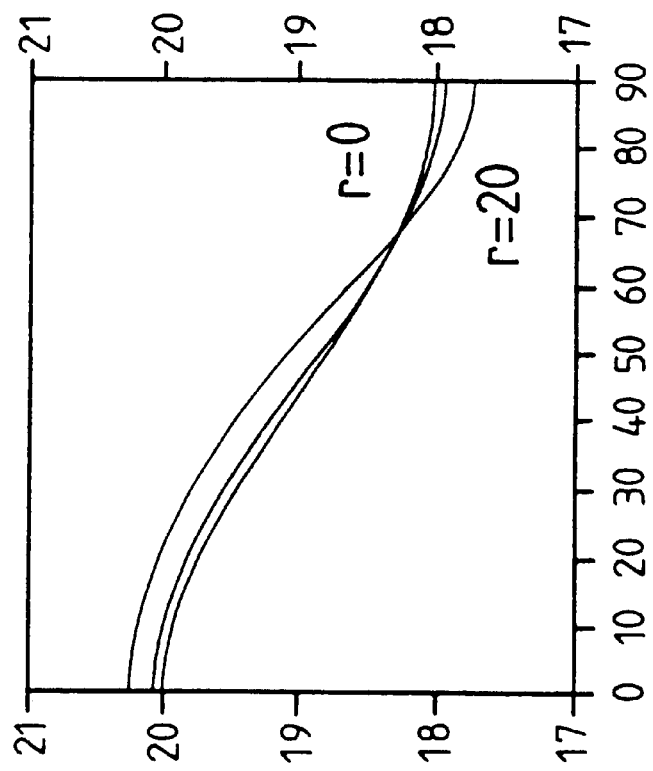
Figure 13A:
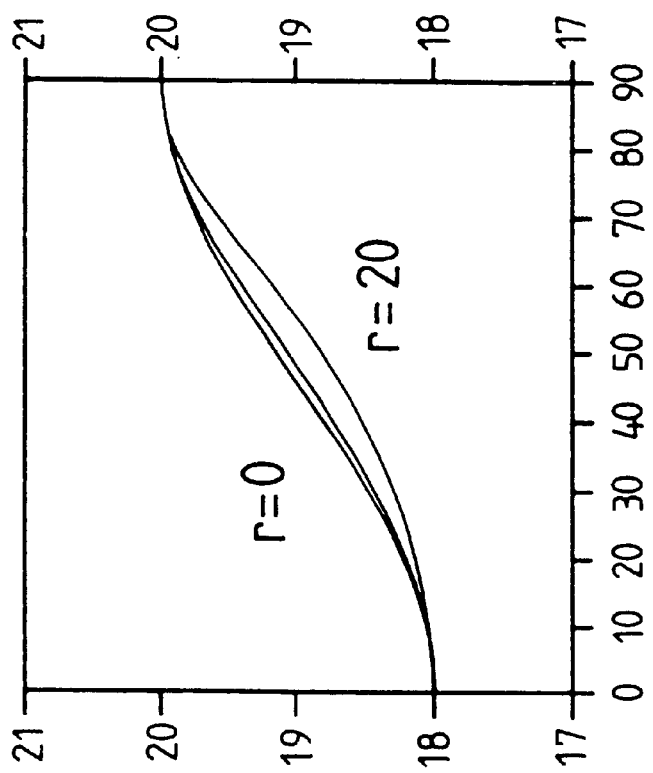

There is something obviously asymmetrical about both of these torics; they each have a preferred meridian. There are, however, functions that preserve the correct tangential powers along the main meridians but treat the sagittal powers more symmetrically. One way to construct a function with the desired tangential behavior is to force the cross section along every meridian to be circular. The function would have the form $$z(r, \theta) = R(\theta) - \sqrt{R(\theta)^2 - r^2}$$

Where R(θ) is the radius of curvature along the θ Meridian, and $r = \sqrt{x^2 + y^2}$. The values of R(0) and R(90) are fixed by the desired tangential powers and the powers at intermediate angles are determined by interpolating between these end values. A form for the interpolation comes from the recognition that the form of the above power profiles are nearly sinusoidal. So a good first approximation for the R(θ) would be $P(\theta)=P(0)+(P(90)-P(0))(1+\cos 2\theta)/2$, and $R(\theta)=(n-1)/P(\theta)$ where P is the tangential power and n is the index of refraction needed to convert power to curvature. To add more control over the sagittal behavior, more Fourier terms could be added to the interpolation. For more control over the tangential behavior the power could be made polynomial in r. For a simple surface no extra degrees of freedom would be required. The plots of FIG. 13 show the tangential and sagittal powers as a function of angle as shown above for the torics. Notice that the tangential errors at intermediate angles are less than the donut and greater than the barrel torics. Notice also that the sagittal power is correct at 0 and 90 for r=0 but starts missing on both meridia, more or less symmetrically, as the radius increases. For a surface that is not axially symmetric there is a weak contribution from the angular behavior on the tangential curvature. This is because the normal vector is not in the same plane as the circular cross section.

Another way to produce an "unbiased" cyl correction surface is to average the conventional donut and barrel torics together. Doing this gives results that are similar to those for the surface constructed from circular meridians. The angular plots for the averaged torics are shown in FIG. 14 in which $z=a_B Z_B+(1-a_B)Z_D$ where Z is the surface height of the lens, $Z_B$ is the surface height of a conventional barrel toric; $Z_D$ is the surface height of a conventional donut toric; and $a_B$ is a weighting factor such that $1>a_B>0$. FIG. 14 shows the specific case for $a_B=0.5$.

It is difficult to tell from the plots of FIG. 14, but there are significant differences in the angular behavior of the tangential and sagittal powers for these circular meridia and averaged toric surfaces. The contour plots of FIG. 15 compare the surface astigmatism of the averaged torics and the circular meridian functions. The plots have the same 0.1 diopter contours and 45 mm diameters as before.

Figure 16:
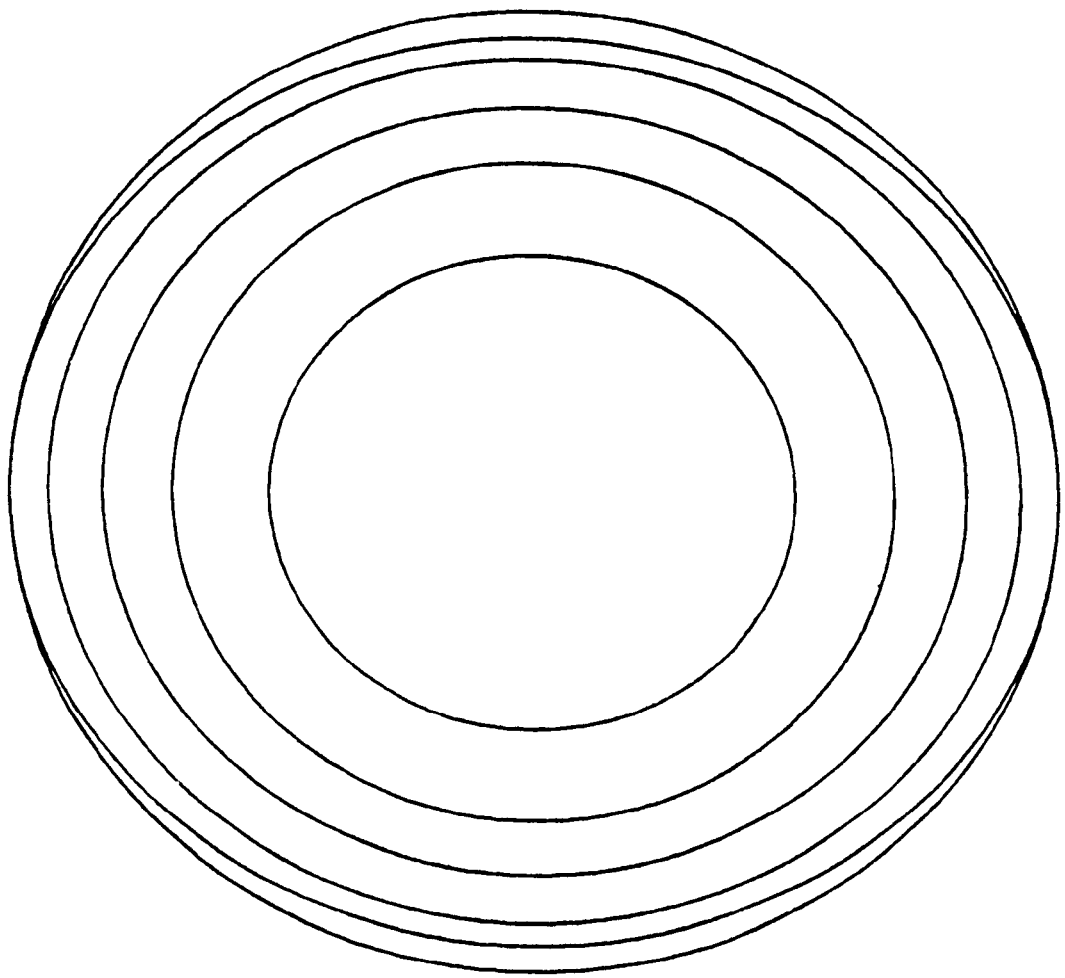

The astigmatism behaves more simply for the circular meridian surface than for the averaged torics. To show the effect of adding Fourier terms to the angular interpolation, one extra coefficient can be adjusted to "round out" the elliptical looking contours. The results are shown in FIG. 16. Note that the meridians still all have circular cross sections, only the angular interpolation has been changed slightly.

The circular meridia and average toric surfaces have additional properties of note. The surface astigmatism of the surface at any point off the principle meridia is less than the larger of the surface astigmatism of the barrel toric or the donut toric at the same point. In addition, the average toric or circular meridia surfaces lie between (have an intermediate Z value) between the barrel toric and the donut toric of the same prescription.

While the foregoing torics are preferred for use as back surfaces for lenses of preferred embodiments of the present invention, it is possible to use conventional torics or generalized torics to provide for the lens.

Alternatively surface correction for lens elements of the present invention may be provided by producing a back surface in accordance with the following mathematical description of a symmetric polynomial:

$$z = \sum_{k=0,2...}^{n} \sum_{j=0,2...}^{k} c_{k-j,j} x^{k-j} y^j;$$

A number of measures of optical aberrations of a lens are defined as follows:

$$\text{Mean Power Error(MPE)} = \frac{\varepsilon_{11} + \varepsilon_{22}}{2}$$

$$\text{Cyl Error} = ((\varepsilon_{11} - \varepsilon_{22})^2 + 4\varepsilon_{12}^2)^{\frac{1}{2}}$$

$$\text{RMS Power Error(RMS blur)} = \left(\frac{\varepsilon_{11}^2 + 2\varepsilon_{12}^2 + \varepsilon_{22}^2}{2}\right)^{\frac{1}{2}}$$

$$= \left((mpe)^2 + \frac{1}{4}(cyl\ error)^2\right)^{\frac{1}{2}}$$

where $\epsilon$ is the focal error matrix and may be written $$\varepsilon = \begin{pmatrix} \varepsilon_{11} & \varepsilon_{12} \\ \varepsilon_{21} & \varepsilon_{22} \end{pmatrix}$$

where $\epsilon_{12}=\epsilon_{21}$ by the choice of the orthonormal basis set.

Where these terms are calculated by considering specifically the optical properties of the lens, the terms Optical Mean Power Error, Optical Cyl Error and RMS Optical Power Error apply.

The merit function(s) may be selected from the following functions depending on the specific application of the optimized lens:

$$M_1 = \sum_\theta (\text{rms}\ blur)_\theta^2$$

$$M_2 = \sum_\theta ((mpe)^2 + (cyl\ error)^2)_\theta$$

$$M_3 = \sum_\theta \left(\frac{1}{16}(mpe)^2 + (cyl\ error)^2\right)_\theta$$

$$M_4 = \sum_\theta^{horizontal} (\varepsilon_{11})_\theta^2 + \sum_\theta^{vertical} (\varepsilon_{22})_\theta^2 + \sum_\theta^{oblique} (mpe)_\theta^2$$

$$M_5 = \sum_\theta \left((mpe)^2 + \frac{1}{16}(cyl\ error)^2\right)_\theta$$

where summations are over a number of eye rotations $\theta$.

In the case of $M_4$, there are different blur measures used depending upon whether the sample point $\theta$ represents a horizontal, vertical, or oblique rotation from the "straight ahead" position. This mode may provide some generalization of the aspheric "minimum tangential error" design strategy.

The modes $M_3$ and $M_5$ represent "minimum astigmatic error" and "minimum mean power error" strategies respectively.

In a still further embodiment, a term may be included in the merit function that represents the cosmetics of the lens. For example, instead of using M alone, a modified merit function may be defined by $$M^* = M + \eta_\theta \lambda^2 \left(\frac{V}{\Pi r^2}\right)^2$$

where $\eta_\theta$ denotes the number of sample eye rotations $\theta$ considered in M, r is a specified lens radius, and V is the lens volume out to the radius r. The factor $\lambda$ is seen to be weighting on the average lens thickness.

III. Reduction of Magnification and Distortion

Spectacle lenses either minify or magnify objects viewed through them. This occurs because the principal planes of conventional spectacle lenses are located close to the lens and do not coincide with the entrance pupil of the eye. In general, plus power lenses make things look bigger, and minus power lenses make things look smaller. Magnification also changes the perceived direction of objects in the peripheral field, and causes the apparent field of view to differ from the true field of view through the lens.

In addition to magnification, spectacle lenses also distort the shape of objects viewed through them. For an eye looking straight ahead, minus lenses create so-called "barrel distortion", in which rectangular objects appear compressed in the periphery so that squares look like barrels. Conversely, plus powered lenses create "pincushion distortion", which stretches out the corners of the squares.

The two effects add together to degrade the perception of object size, shapes, and position. Textbooks on ophthalmic optics teach that it is not practical to correct distortion in spectacle lenses, and are silent about the desirability of reducing magnification effects. Yet one of the touted visual advantages of contact lenses is that the close fit of the lens to the eye reduces magnification and distortion effects, allowing a more natural correction of vision. It would seem desirable to reduce the magnification and distortion of spectacle lenses if it is possible.

For a distant object, the magnification effect is defined by the following equation:

$$\text{Relative Spectacle Magnification} = \left(\frac{1}{1-dF_v}\right)\left(\frac{1}{1-\frac{tF_1}{n}}\right)$$

where d ($d_v$ in FIG. 3) is the distance from the back surface of the lens to the entrance pupil of the eye, $F_v$ is the back vertex power in diopters, t is the thickness in meters, n is the index of refraction, and $F_1$ is the front surface power in diopters.

The part of the equation inside the first set of brackets is often called the "Power Factor" because it shows how much magnification is due to the lens power. If d could be equal to zero, then the power factor would be equal to 1. In other words, a lens in contact with the eye would have very little magnification due to its power, and this is what happens with contact lenses. Spectacle lenses are positioned away from the eye to avoid contact with the eye, eyelids, or eyelashes so this term is greater than 1 for plus lenses and less than 1 for minus lenses. In other words, plus power spectacle lenses tend to magnify and minus lenses tend to minify. According to context, the term "magnification effects" are used to describe both magnification and minification.

The part of the equation inside the second set of brackets is usually called the "Shape Factor" because it shows how magnification varies with the thickness and curvature of the lens. If lenses had no thickness, then t would equal zero and this term would be equal to 1. The ideal "thin lens" of third order optics would not have any magnification effect due to shape. Contact lenses come close to approximating this condition because they can be made extremely thin. Spectacle lenses do have a significant thickness to avoid breakage and always have positive front surface curvatures, so this term always is greater than 1. In other words, all positive meniscus spectacle lenses tend to magnify due to their shape.

To eliminate magnification effects, the equation must be set equal to 1, so the product of the power and shape factors must be equal to 1. Since both the power factor and shape factor in plus lenses are each greater than one, their product cannot equal 1, so no plus lens in a positive meniscus form can ever be free from magnification. On the other hand, minus lenses have power factor less than 1 and a shape factor greater than 1, so it is possible to force these factors to cancel.

To do this, we must solve this equation for unit magnification. After doing so we get the following relationship:

$$t = -\frac{ndF_v}{F_1(1-dF_v)} \tag{1}$$

This equation specifies the lens thickness which eliminates spectacle magnification effects. It works by placing the second principal plane of the lens at the entrance pupil of the eye. Achieving this in a practical thickness requires two things: a minus lens power and very steep curves.

Distortion

According to third order theory, distortion can only be eliminated within lenses so steeply curved as to be impracticable. Jalie, M. *The Principles of Ophthalmic Lenses* $4^{th}$ Edition p. 461.

Third Order theory in fact requires back surface curves in excess of 35 Diopters, which would be nearly concentric around the entrance pupil of the eye; such surfaces indeed would be impractical. A truly concentric lens design which has both surfaces concentric around the entrance pupil of the eye would have no distortion at all because the symmetry of the lens would ensure that all bundles of rays from oblique objects would encounter the same surface slopes as do those from central objects. While concentricity about the entrance pupil does require extremely steep curves, we have found that somewhat flatter curves also drastically reduce distortion when they are combined with lenses which have principal planes located close to the entrance pupil. This occurs with lenses designed to reduce minification in minus power lenses, and result in lenses which are more nearly concentric around the centroid of rotation of the eye.

In fact, it is highly desirable to make the lens concentric about the center of rotation of the eye, because this will improve the symmetry of the lens for the eye as it turns to view objects in the peripheral field, resulting in improved resolution. If we strictly require that one surface of the lens be concentric around the centroid of rotation of the eye, we can derive a thickness which virtually eliminates distortion. In this case, a special form of the equation for lens thickness is required.

Figure 1:
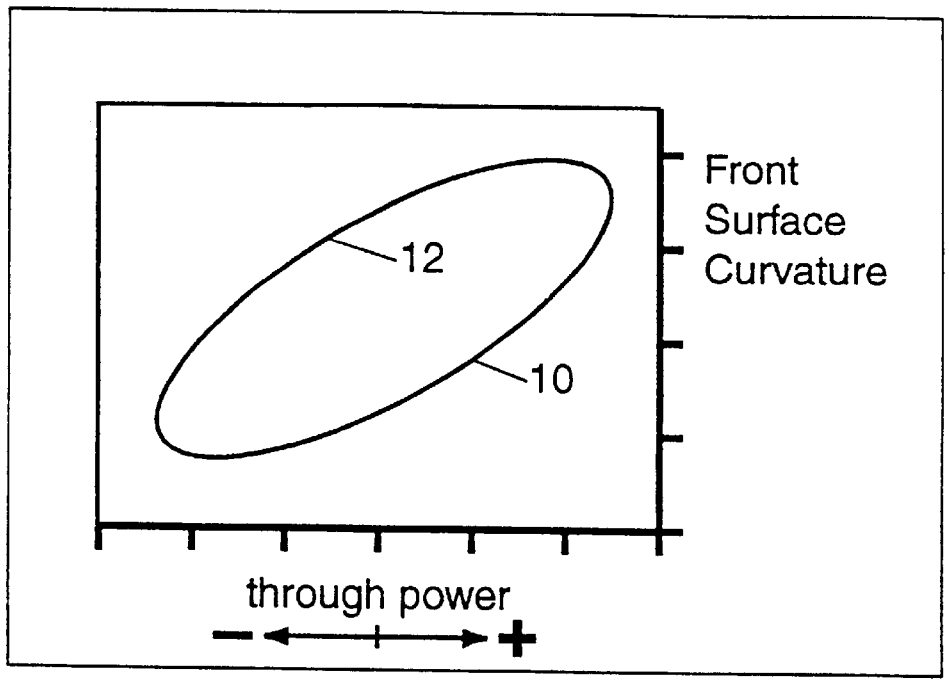
FIG. 1 is a drawing of a Tscherning ellipse.
Figure 2:
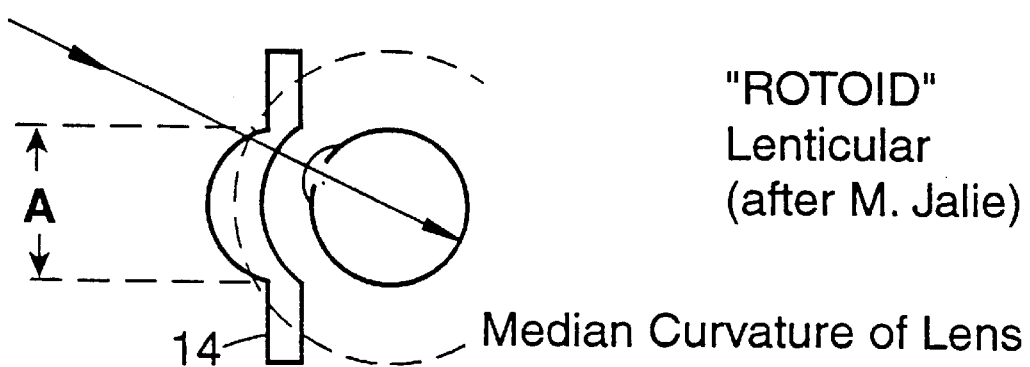
FIG. 2 is a cross-sectional view of a prior art, high plus power "rotoid" lens.
Figure 3:
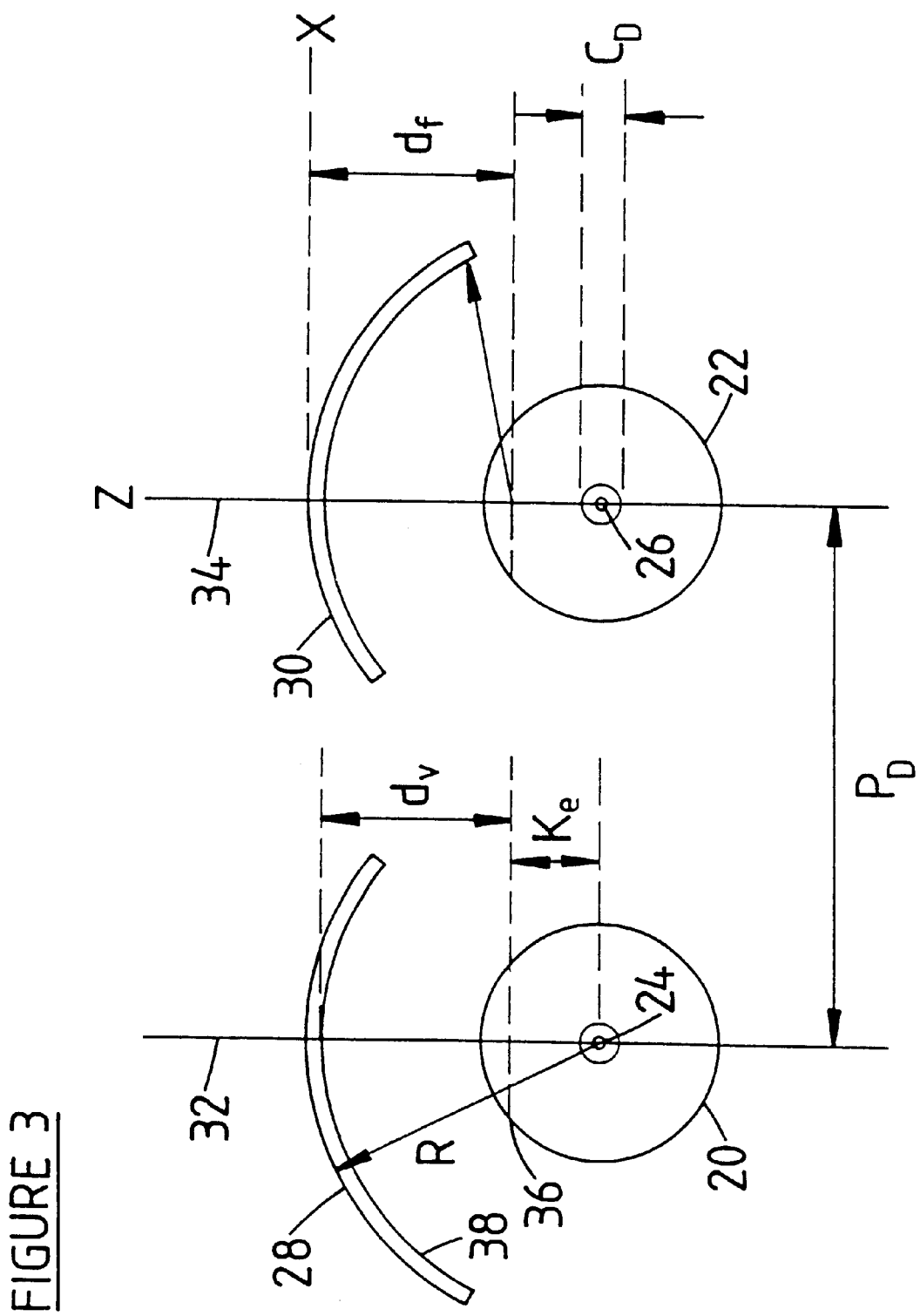
FIG. 3 is a cross-sectional top view of a pair of human eyes, and lenses configured in accordance with a preferred embodiment of the present invention.
Figure 4:
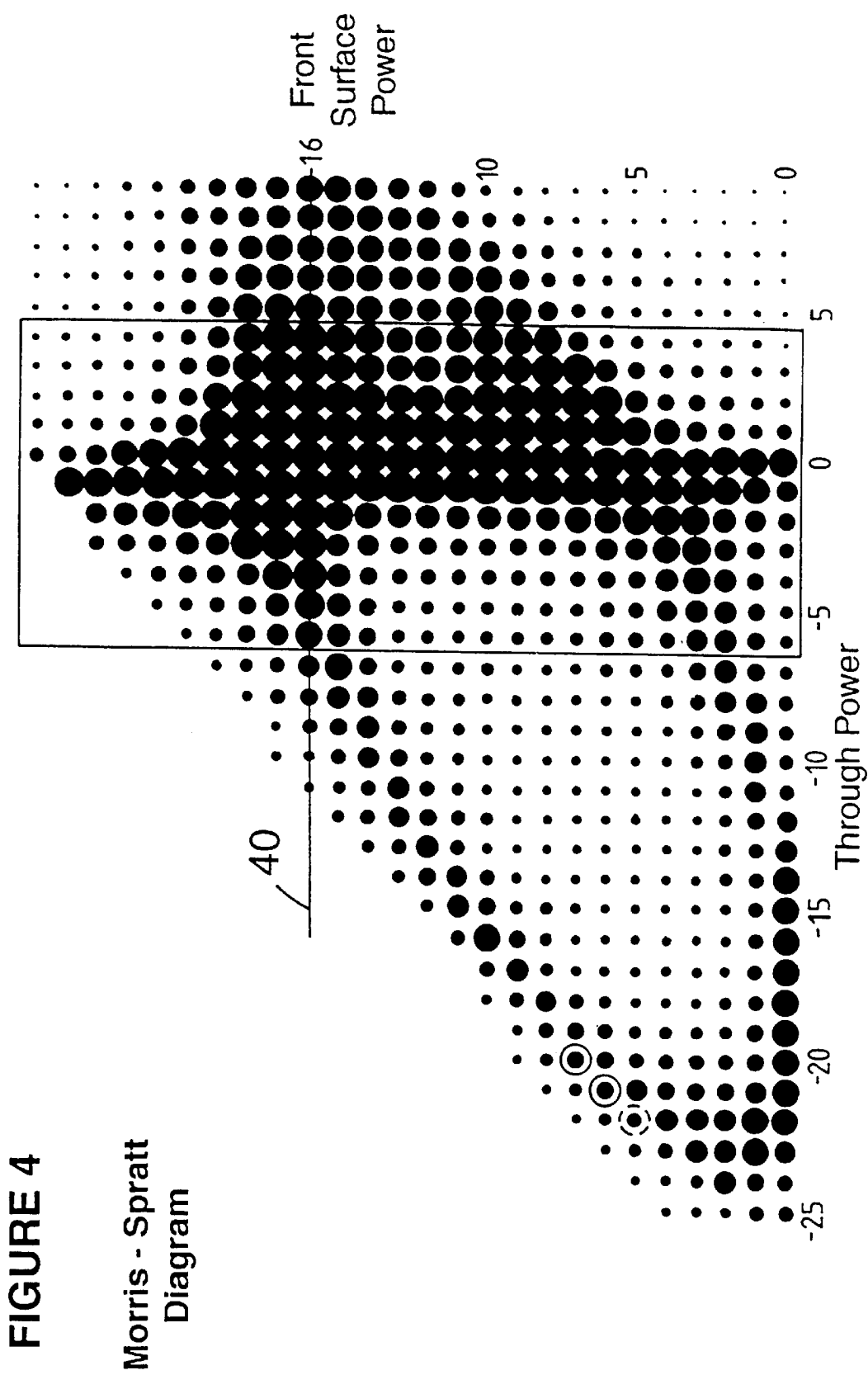
FIG. 4 is a Morris-Spratt diagram illustrating properties of series of lens elements made in accordance with teachings of the present invention.
Figure 5:
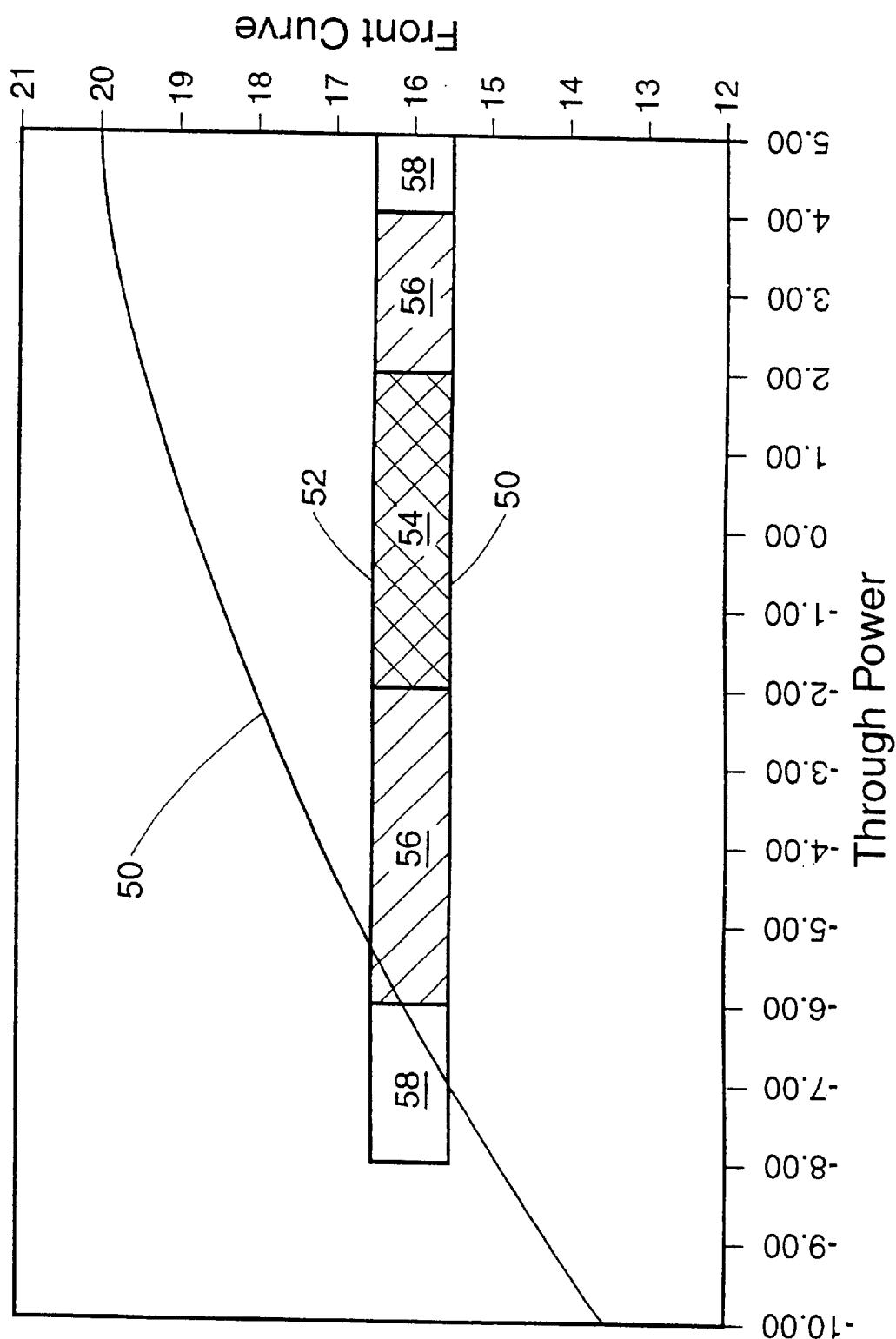
FIG. 5 is a diagram of front curves and through power ranges selected in accordance with the present invention, with a portion of the Tscherning ellipse for this special case, overlaid thereon.

For example, in a lens which has its front surface concentric around the centroid of rotation of the eye, we can solve for t in terms of the radius of the front surface, fitting distance, the index of refraction, the back vertex power, and the distance of the entrance pupil from the center of rotation of the eye. In this case $$t = \frac{[F_v(r_1 - K_e + k_1) - 1] + \sqrt{(F_v(r_1 - K_e + k_1) - 1)^2 - 4F_v^2 d_f k_1}}{2F_v} \tag{2}$$

where $$k_1 = \left(\frac{nr_1}{n-1}\right)$$

is a lens shape factor, $r_1$=radius of front surface; $d_f$=distance from the front lens surface to the plane of the entrance pupil;

and $K_e$ is the distance from the center of rotation of the eye to the entrance pupil of the eye as shown in FIG. 3.

Figure 17:
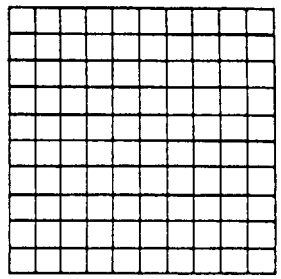
FIGS. 17(a), (b) and (c) illustrate an object grid and images thereof.
Figure 17:
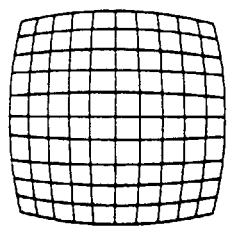
Figure 17:
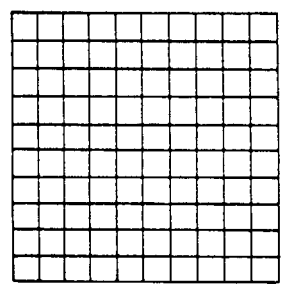

FIGS. 17(a)–(c) show the advantage of this kind of design. FIG. 17(a) is a representation of a large grid to be viewed from a great distance, such that the grid extends 45 degrees to the left and right of the viewer. FIG. 17(b) is a calculated image of what a person wearing a conventional −5.00 D lens would see: the grid appears smaller and distorted in shape. FIG. 17(c) shows the calculated image seen by a person wearing a lens designed to eliminate distortion according to the previous equations. The image appears almost identical to the original object.

IV. Lens Manufacture

Ophthalmic lens elements according to the present invention may be formulated from any suitable material. A polymeric material may be used. The polymeric material may be of any suitable type. The polymeric material may include a thermoplastic material such as polycarbonate or thermoset material such as diallyl glycol carbonate type, e.g. CR-39 (PPG Industries) may be used.

The polymeric article may also be formed from cross-linkable polymeric casting compositions, for example as described in U.S. Pat. No. 4,912,155 or U.S. patent application Ser. No. 07/781,392, the entire disclosures of which are incorporated herein by reference.

The polymeric material may include a dye, including, for example, a photochromic dye, which may be added to the monomer formulation used to produce the polymeric material.

The optical lens element according to the present invention may further include standard additional coatings to the front or back surface, including electrochromic and/or liquid crystal coatings. The front lens surface may include an anti-reflective (AR) coating, for example of the type described in U.S. Pat. No. 5,704,692, the entire disclosure of which is incorporated herein by reference. To make sun lenses or to provide a desired cosmetic effect, a partially reflective coating may be applied to the lens. The front lens surface may alternatively or additionally include an abrasion resistant coating, for example of the type described in U.S. Pat. No. 4,954,591, the entire disclosure of which is incorporated herein by reference.

The front and back surfaces may further include one or more surface treatments conventionally used in casting compositions such as inhibitors, dyes including thermochromic and photochromic dyes, for example as described above, polarizing agents, UV stabilizers and materials capable of modifying refractive index.

Figure 18:
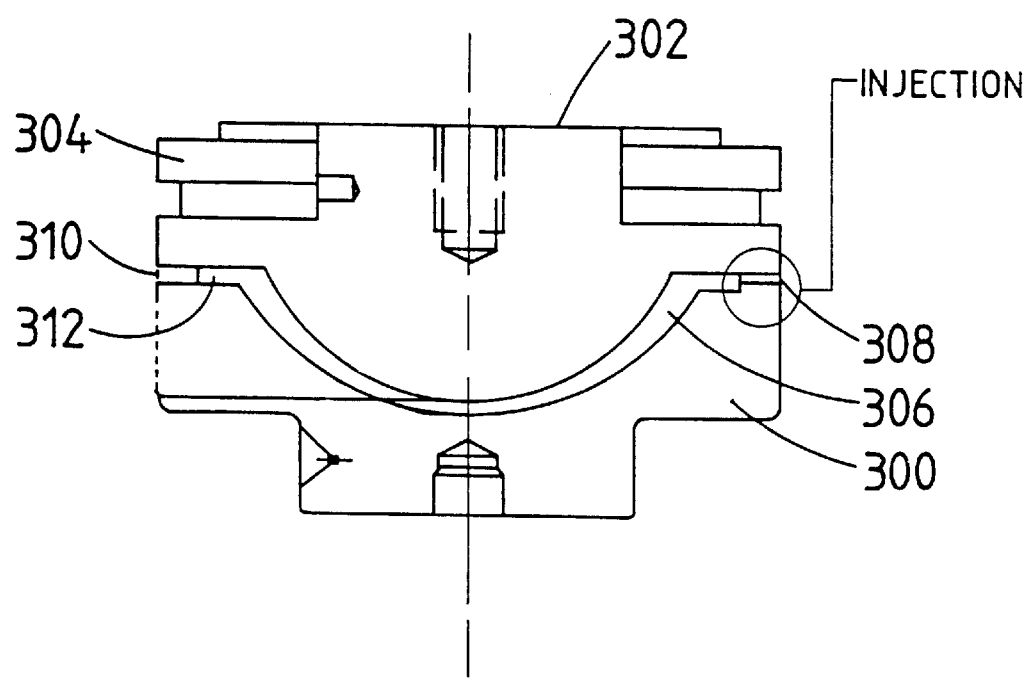
FIG. 18 is a cross-sectional side view of a mold which may be used to make lens elements of embodiments of the present invention.

FIG. 18 illustrates a mold suitable for making a lens element in accordance with teachings of the present invention. The mold includes a front mold portion 300, a back mold portion 302 and closure flange portion 304. The lens element may be formed in the cavity 306 between the mold halves by injecting liquid lens material through port 308. Air escapes through port 310. When the lens element is hard, the mold halves are separated. It will be observed that the lens element as it leaves the mold will have a radial flange 312, which may be removed in later processing.

Processes and apparatus for molding the lens elements of the present invention are described in U.S. patent application Ser. No. 09/658,496 to Kingsbury et al. filed Sep. 8, 2000 entitled "PROCESS FOR MOLDING THERMOPLASTIC LENSES AND STEEPLY CURVED AND/OR THIN LENSES PRODUCED THEREBY", the contents of which are hereby incorporated by reference in its entirety.

V. Calculated Performance of Lens Design Examples

EXAMPLE 1

Table 1 shows a comparison of the calculated performance of a polycarbonate lens made in accordance with the present invention and a conventional low base curve lens.

|  | Concentric form | Conventional |  |
|---|---|---|---|
| Index of refraction | 1.586 | 1.586 | |
| Power | −3.00 | −3.00 | diopters |
| Thickness | 2.0 | 2.0 | in mm |
| Front Surface Curvature (1.530 tooling index) | 16.00 | 4.00 | diopters |
| Front Surface Radius | 33.1 | 132.5 | mm |
| Optical power of front surface | 17.7 | 4.4 | diopters (higher due to 1.586 index) |
| Paraxial Magnification | 0.97 | 0.96 | |
| Apparent field of view | 130 | 105 | in degrees, for the edge outline of FIG. 10(a) |
| Optical Values at 30 degree eye rotation: | | | |
| Distortion | −1.10% | −3.10% | |
| Astigmatism | 0.02 | 0.17 | diopters |
| Mean Power Error | 0.07 | 0.025 | diopters |
| RMS Power Error | 0.07 | 0.09 | |
| Chromatic Abberation | 0.11 | 0.16 | prism diopters |

EXAMPLE 2

Figure 19:
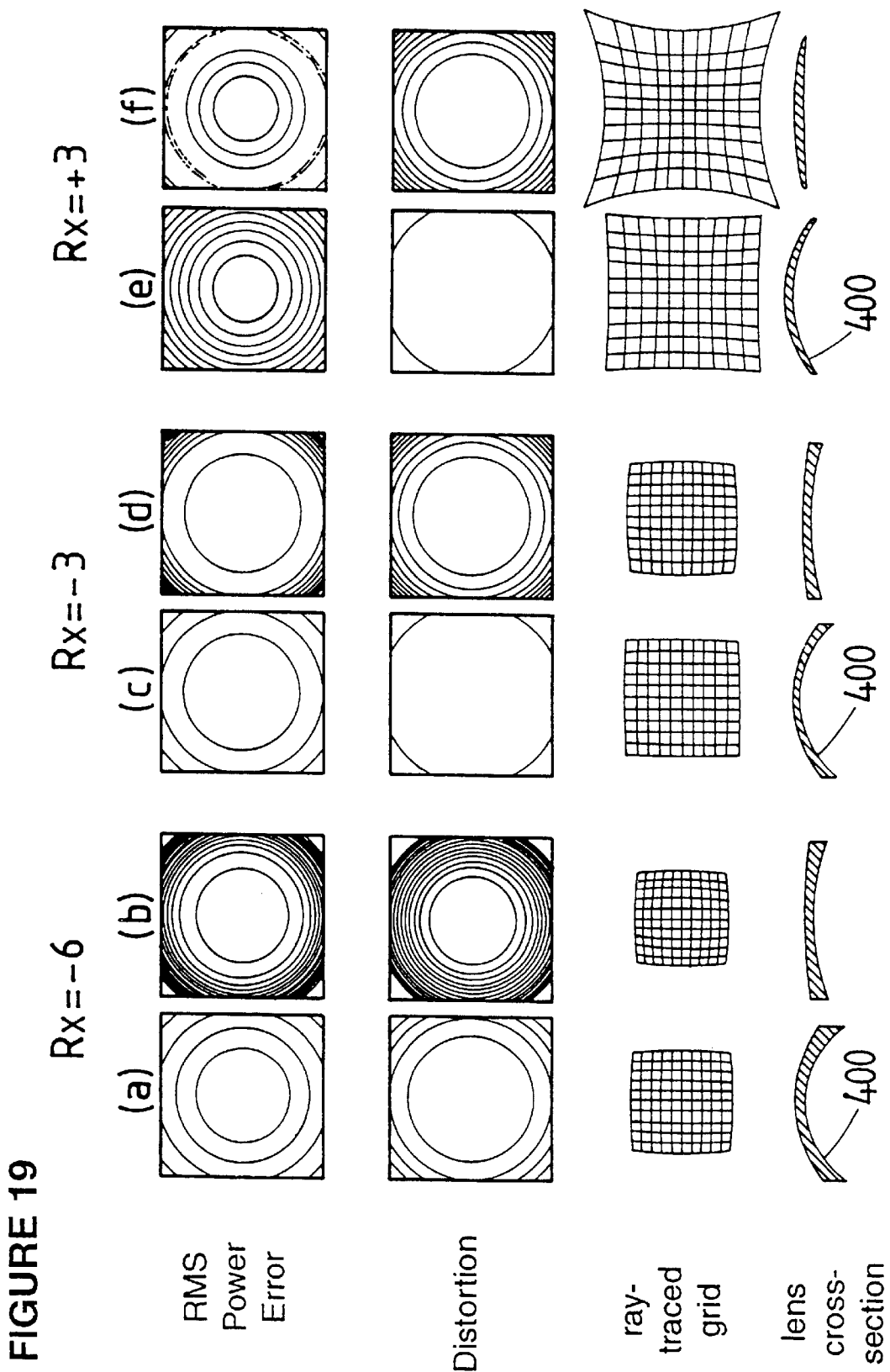
FIGS. 19(a), 19(b), 19(c), 19(d), 19(e) and 19(f) contain plots of RMS power error and distortion and a ray-traced grid calculated for three conventional low base lens and three steeply curved lens elements in accordance with the present invention.

FIG. 19 illustrates a calculated comparison between a series of steeply curved spherical lens elements of −6 D, −3 D and +3 D power [FIGS. 19(a), (c) and (e), respectively] with corresponding low base curve Sola Perma-Poly™ stock lenses [FIGS. 19(b), (d) and (f), respectively].

The steeply curved spherical lens elements have essentially identical, spherical front surfaces of 16 D as shown in the lens cross sections 400. Generally, the steeply curved spherical lens elements provide superior peripheral distortion. The lenses of FIGS. 19(a) and 19(c) also exhibit reduced RMS power error in the minus prescriptions.

EXAMPLE 3

Figure 20:
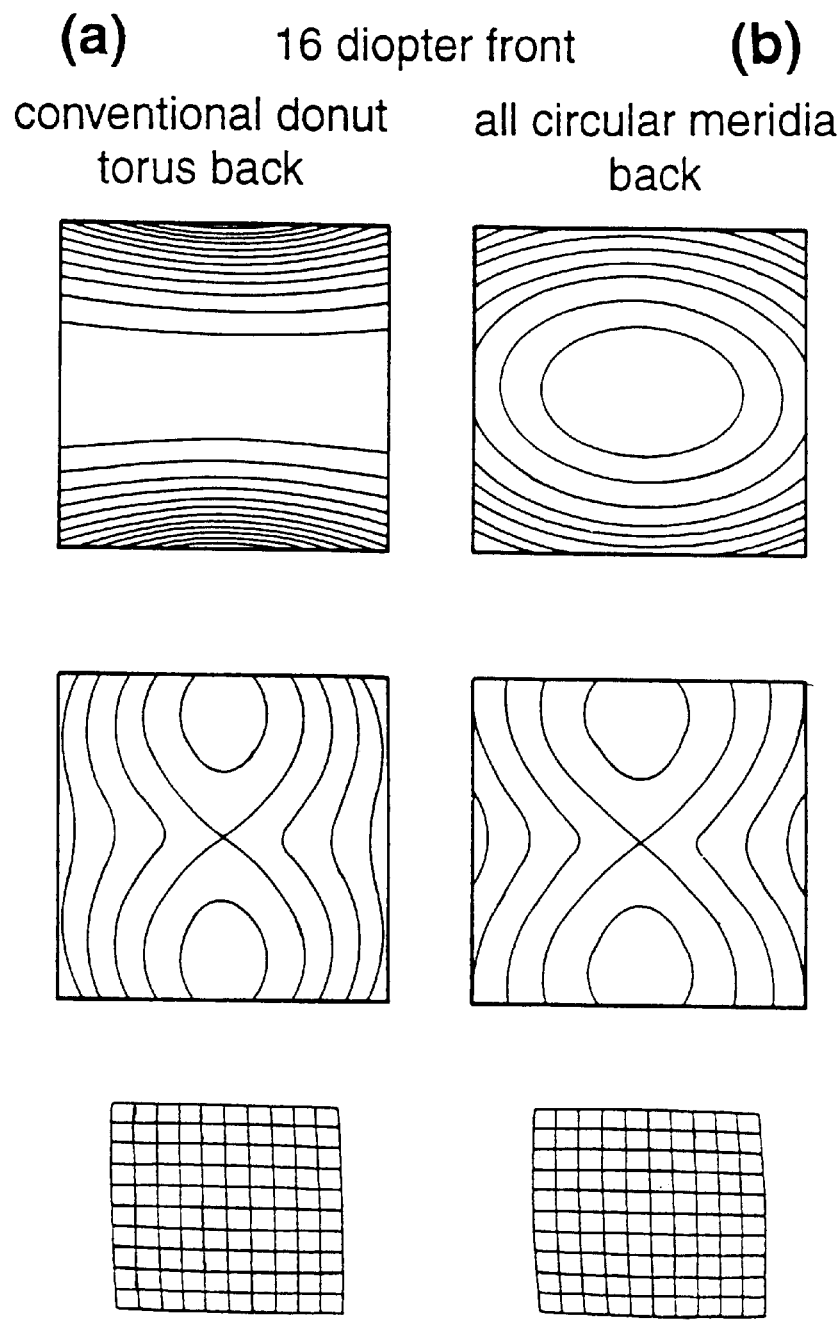
FIGS. 20(a) and 20(b) contain plots of RMS power error and distortion and a ray-traced grid calculated for a steeply curved lens with a conventional toric back and for an all-circular meridia back.

FIG. 20 illustrates a calculated comparison between two steeply curved spherical lens elements with a 16 D front surface −3 D through power and a back surface cyl correction of −2.

The lens of FIG. 20(a) has a conventional donut torus back; the lens of FIG. 20(b) has an all circular meridia back of the type described above. The latter exhibits superior RMS power error and somewhat improved distortion.

EXAMPLE 4

The final set of examples (FIGS. 21 and 22) are a calculated comparison between a conventional base curve progressive lens and a progressive lens according to the present invention.

FIG. 21 compares distance vision properties of a conventionally curved Sola XL progressive lens, with a lens in which a similar progressive form is placed on a lens element with steeply curved (16 D) base curve.

FIG. 22 compares near vision properties of the Sola XL progressive lens with the steeply curved lens of FIG. 21.

Generally speaking, progressive lenses made in accordance with the present invention are characterized by a steeply curved reference sphere or spherical shell approximately concentric with the centroid of rotation of the wearer in the as worn position. Such lenses have an upper viewing zone for distance vision; lower viewing zone, having a greater power than the upper viewing zone for near vision and an intermediate zone connecting the upper and lower zones, with power varying between the upper and lower zones, including a corridor of relatively low surface astigmatism.

In one embodiment the steeply curved reference sphere corresponds to the front surface of the central part of the upper viewing zone. In another embodiment, the progressive surface is on the front surface of the lens and lies within a steeply curved spherical shell of thickness less than about 2 mm. In both embodiments the radius of curvature of the shell or reference sphere may be less than 50 mm, preferably between 30 and 35 mm, most preferably about 33 mm±about 2 mm. Suitable front surface designs for progressive lenses are illustrated for example in applicant's patent application Ser. No. 08/782,493 filed Jul. 10, 1997, now U.S. Pat. No. No. 5,861,935.

VI. Glazed Lenses and Spectacle Frames

Spectacle frames for use in the present invention are adapted to hold lenses of the present invention in the approximate positions shown in FIG. 3. The spectacle frame may be rimless, partial rim or full rim.

In preferred embodiments the lenses, when mounted in the spectacle frame, exhibit essentially no tilt or wrap angle. The spectacle frame may include an adjustable mechanism for altering the positions of the optical axes of the lens to correspond to the axes of straight-ahead vision of the wearer.

Figure 23:
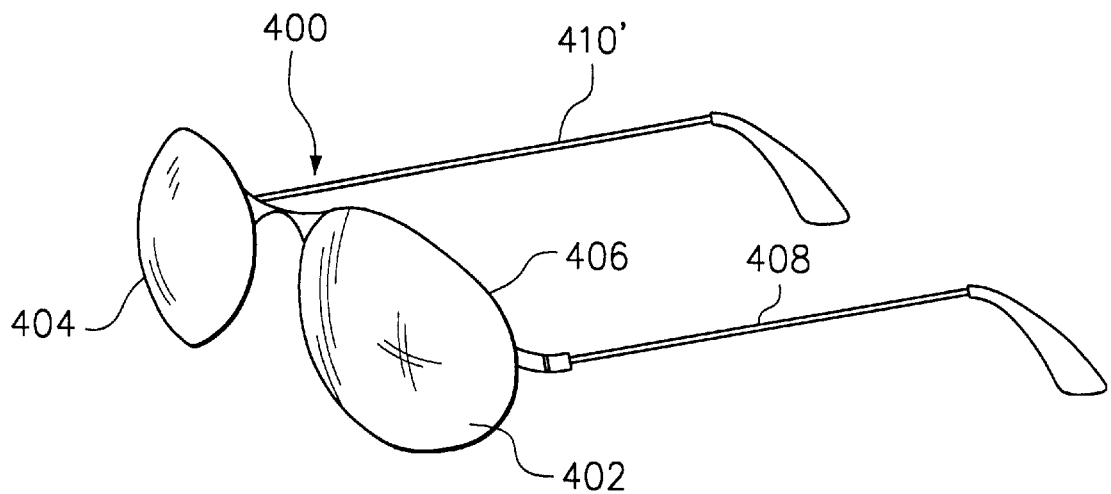

FIG. 23 is a perspective view of eyewear 400 including lenses 402 and 404 and spectacle frames of the present invention. The lens shape creates a cosmetically interesting object. The spectacle frame in FIG. 23 is shown with a rim portion 406 and temple pieces 408 and 410. The rim of the spectacle frame surrounding each lens is adapted to correspond to a closed curve lying on or near the steeply curved reference sphere of the lens. Because of the consistency of this curvature through a range of prescriptions, a single frame or frame design may be fit to any prescription in the range.

Figure 24:
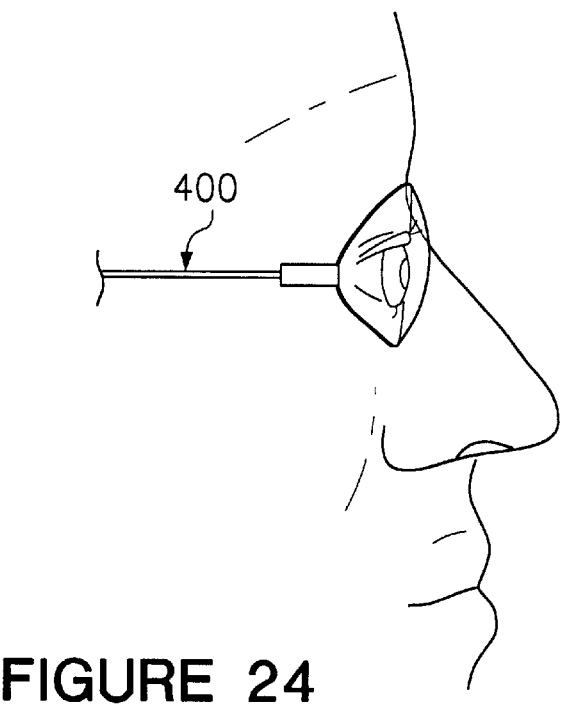

FIG. 24 is a side elevation of the eyewear of FIG. 23 on the face of the wearer. The Figure illustrates another aspect of the visual appearance of the eyewear due to the steep curvature of the lens and the complex three-dimensional shape of the lens edge. The Figure also illustrates that a lens of relatively small size provides a wide field of view and good eye protection.

Figure 25:
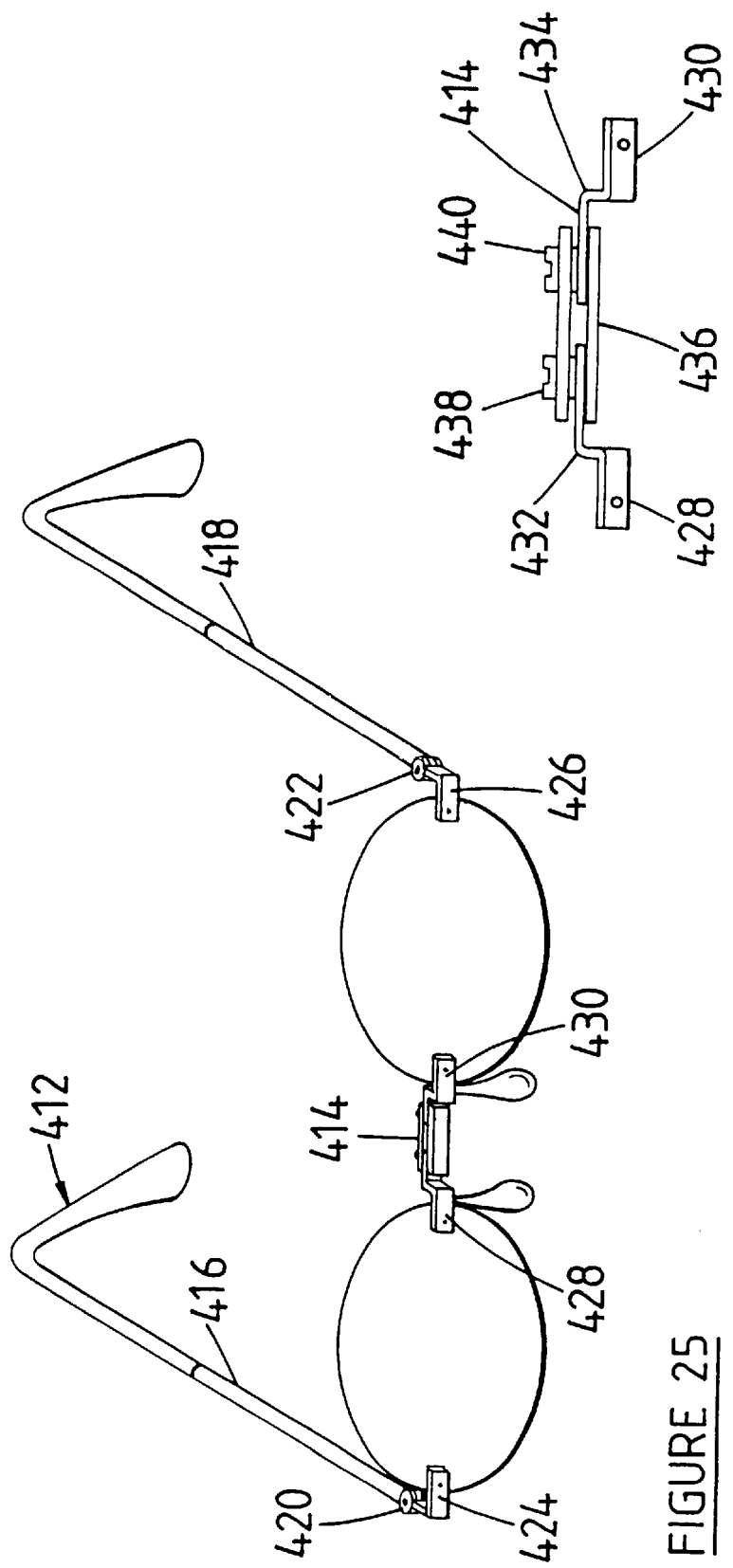

FIG. 25 is a front pictorial view of eyewear embodiment 412 according to the present invention illustrating certain mechanical aspects of the invention. The spectacle frames of the embodiment of FIG. 25 include a nose bridge 414 and hinged temple pieces 416 and 418. Together these components comprise a three-piece, rimless spectacle frame.

The temple pieces 416 an 418 include hinges 420 and 422, and mounting tabs 424 and 426. In a preferred embodiment, the tabs 424 and 426 are surface mounted onto the spherical front surfaces of the lenses. It will be understood that these mounting surfaces will have a consistent position and angular relation with respect to the frame, regardless of the prescribed through power and cyl correction of the lens. In a similar fashion, tabs 428 and 430 of the nose bridge 414 may be surface mounted on the respective front surface edges of the lens.

The nose bridge 414 is shown in cross-section in FIG. 25(a). Advantageously, the nose bridge may be made an adjustable length to compensate for different pupillary distances ($P_D$ in FIG. 3) commonly found in different wearers. This adjustable feature permits the optical axes of the lenses to be aligned with the axes of vision of both wearer's eyes.

One mechanical structure suitable for producing this adjustable feature is shown in FIG. 25(a), it being understood that other combinations of moving or flexible structures could be adapted to the purpose. In the embodiment of FIG. 25(a), the tabs 428 and 430 are each carried by members 432 and 434, respectively, which are inserted into opposite ends of a tube 436. Set screws 438 and 440 hold the members 432 and 434 in position. The set screws may be loosened to permit adjustment of the length of the nose bridge by sliding the members 432 and 434 within the tube to different positions.

Figure 26:
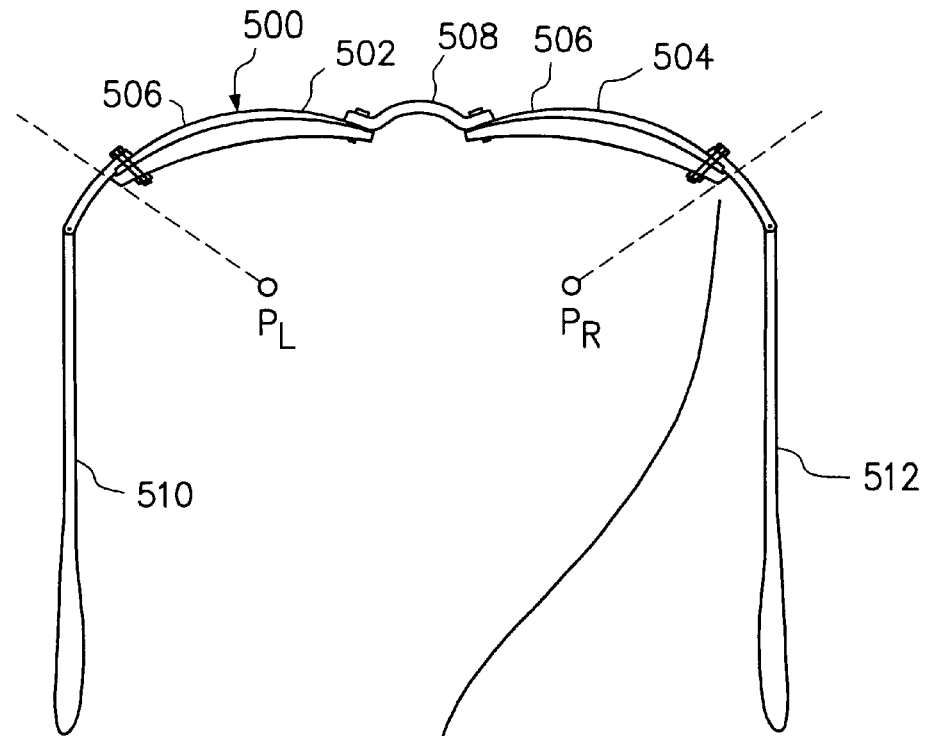
FIG. 26 is a plan view of an eyewear embodiment of the present invention.

FIG. 26 is a plan view of an eyewear embodiment 500 of the present invention. The eyewear is of the rimless type. A left lens 502 and a right lens 504 are steeply curved, edged lenses. In preferred embodiments, they each have an anterior optical surface 506 which is generally spherical with a radius of curvature less than 50 mm and preferably less than 35 mm, as discussed above. In the as worn position, the center of the radius of curvature of the spherical surface of each lens is positioned approximately at the centroids of rotation, $P_L$, $P_R$, of the respective eyes of the wearer.

Lenses 502 and 504 are joined by a nose bridge 508 for supporting the lenses on the face of the wearer. Left and right temple pieces, 510 and 512 are provided and attached to the temporal edges of the left and right lenses, respectively. A preferred manner of attachment will now be discussed in connection with FIG. 26(a).

Figure 26A:
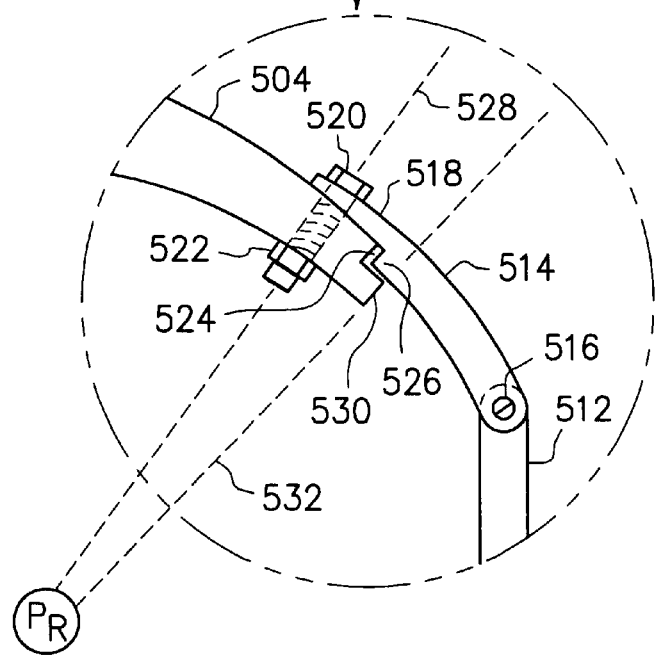
FIG. 26(a) is a detail of the embodiment of FIG. 26 showing a fitment, hinge and edged lens structure.

FIG. 26(a) is a detail of the embodiment of FIG. 26 showing the attachment of the right lens 504 to the right temple piece 512 by means of a right fitment 514 and hinge 516. In a preferred embodiment, the right fitment is arcuate and generally continues along the spherical curvature of the anterior surface of the lens 504. A nasal portion 518 of the fitment 514 overlies the front surface of the lens. A threaded fastening system such as bolt 520 and nut 522 may be used to hold the fitment in position on the lens. In a preferred embodiment, an edge notch 524 in the lens may be provided to receive a locating protrusion 526 of the fitment to further secure the fitment and impede its rotation about a principal axis 528 of the bolt 520. In a preferred embodiment, the principal axis 528 of the fastener lies on a radial line intersecting the center of curvature of the spherical surface of the lens.

A preferred edging of lens elements of the present invention is also shown in detail in FIG. 26(a). As shown, an edge surface 530 of the lens lies approximately along a radial 532 of the spherical surface of the lens. In the as worn position this radial is centered approximately in the centroid of rotation of the eye, $P_R$. This edge configuration makes the lens edge essentially invisible to the wearer, because the edge surface is viewed edge-on by the wearer when the eye rotates so that the angle of regard is directed toward the lens edge. In addition, the edge surface is reduced in size and minimized in appearance to an external observer. Particulars of this edging are illustrated in FIGS. 27 and 28.

FIGS. 27(a)–(d) illustrates several different edge contours which lie approximately along a radial, R, of the spherical surface 534 of the lens. As shown in the Figures, the cross section of the edge surface is approximately perpendicular to a tangent T of the spherical surface at its perimeter, i.e., the line of slight is approximately coplanar with the edge surface.

Figure 27A:
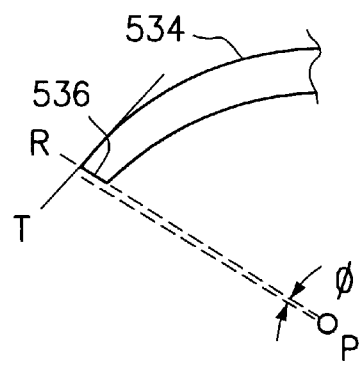
FIGS. 27(a)–(d) are illustrations of various lens edge surfaces employed in preferred embodiments of the present invention.
Figure 27B:
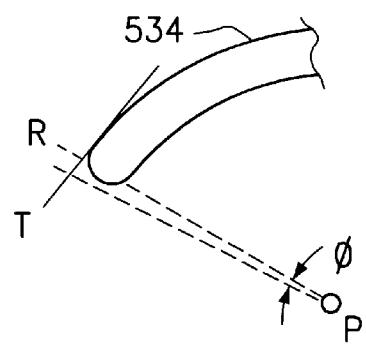
Figure 27C:
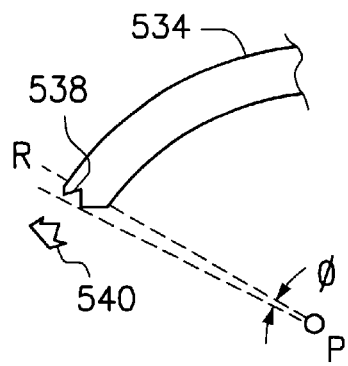
Figure 27D:
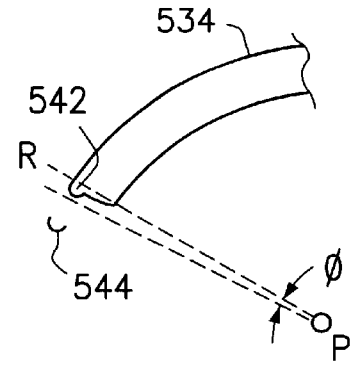
Figure 28:
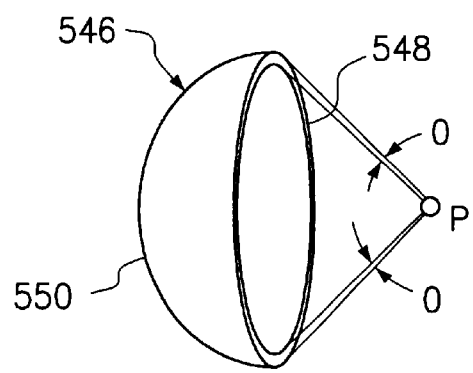
FIG. 28 is a pictorial view of an edged lens of the present invention illustrating the thickness of the edge.

In FIGS. 27(a)–(d) the cross section of each edge surface lies within a small angular range θ with respect to the centroid of rotation P of the eye and is therefore nearly invisible to the wearer. In the example of FIG. 27(a), the cross section of the edge surface is a straight line 536 and θ approaches zero. In the example of FIG. 27(b) a slight rounding has been implemented to eliminate sharp edges which might otherwise present a safety hazard. In the example of FIG. 27(c), a groove 538 has been cut in the edge which is adapted to interfit with a correspondingly shaped portion 540 of the rim of the eyewear. Finally, in the example of FIG. 27(d), a bead 542 has been formed in the edge surface which is adapted to interfit with a channeled rim 544 of the eyewear frames. In these later cases the edge surface is still largely invisible to the wearer.

In the case of the examples of FIGS. 27(b), (c) and (d), advantageously, θ is less than about 5° around the entire perimeter of the lens. This situation is illustrated in FIG. 28 which is a pictorial view of an edged lens 546 made in accordance with preferred embodiments of the present invention. The edge surface 548 of the lens is an annulus perpendicular to tangents of the spherical surface 550 of the lens. The annulus is three-dimensional in the sense that it does not lie entirely in one plane. The edge surface lies between two generally conical shapes 552 and 554 and subtends angle θ, which may vary somewhat at different positions on the perimeter of the lens, but which is typically less than 3°±1.5°.

Figure 29A:
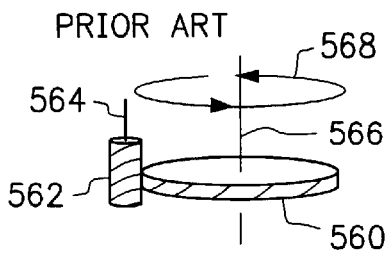
FIGS. 29(a)–(c) are illustrations of several lens edging techniques.
Figure 29B:
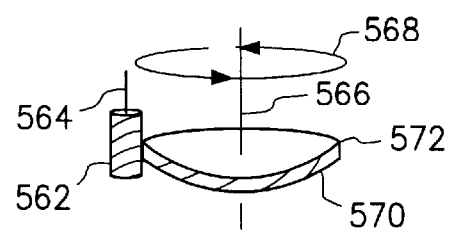
Figure 29C:
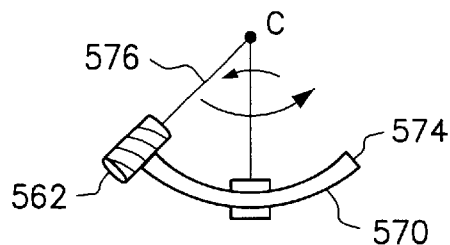

FIGS. 29(a)–(c) illustrate several lens edging techniques. FIG. 29(a) shows the edging of a conventional Ostwalt section lens 560 using a conventional mill 562 rotated about an axis 564 which is maintained parallel to a reference axis 566 (which may be the optical axis of the lens blank). The axis 564 of the mill is moved around the perimeter of the lens as indicated by arrows 568 to form the edge surface. The use of a similar technique to edge a steeply curved lens 570 is shown in FIG. 29(b). The result is an edged lens with sharp edges 572 and edge surfaces which will subtend a large angle in the wearer's peripheral field of view.

In accordance with a preferred embodiment of the present invention, as shown in FIG. 29(c), the edge surface 574 of a steeply curved lens 570 may be generated by a mill 562 rotated about an axis 576 which intersects a center of curvature C of a spherical surface of the lens. Previously, such an arrangement had been employed only to edge non-steeply curved lenses.

VII. Coatings, Sun Lenses And Protective Eyewear

A. Coatings

Lens elements, such as those of the present invention, which have a surface of high curvature, may be particularly difficult to coat with a film for controlling reflectance/transmittance. These difficulties are caused, at least in part, by the geometry of typical coating, evaporation and sputtering systems. The systems are capable of forming relatively uniform films from center to edge of relatively flat lens elements. However, greater variation is observed with the steepening of the surface curvature. The perceived color of the lens element will change with film thickness. It may also vary across the lens due to change in viewing angle. This effect is also more significant in the case of steeply curved lenses. These difficulties are sometimes referred to as "roll off".

Techniques for coating lens elements, particularly highly curved lens elements, are disclosed in the above mentioned International Application No. PCT/AU99/01029 entitled "Coated Lens Exhibiting Substantially Balanced Reflectance". Also discussed are various types of coatings made up of a "stack" of multiple oxide film layers. Such a stack is illustrated generally in FIG. 30(a). In this example, a steeply curved lens 600 has a spherical anterior surface 602 coated with a multilayer film 604 (not drawn to scale).

An example of an antireflectance coating which provides an appearance which is a generally uniform pale blue color from the center to the edge of the coated, steeply curved lens element consists of a stack of five silicon and zirconium oxide layers of various thicknesses. The stack is set forth in Table I below.

TABLE I

| Material | Thickness (nm) |
|---|---|
| Air | |
| $SiO_2$ | 98.96 |
| $ZrO_2$ | 132.79 |
| $SiO_2$ | 36.96 |
| $ZrO_2$ | 16.61 |
| $SiO_2$ | 17.90 |
| Lens | |

In addition to reducing roll off, the lens reduces the highlighting of fingerprints on the lens and is less susceptible to other systematic and non-systematic manufacturing variations. These advantages may be achieved in conventional, Ostwalt section lenses as well.

Techniques for sputter deposition of the aforementioned oxide coatings are disclosed in U.S. patent application Ser. No. 09/605,401 to Burton et al., filed Jun. 28, 2000, the contents of which are hereby incorporated by reference in its entirety.

Figure 31:
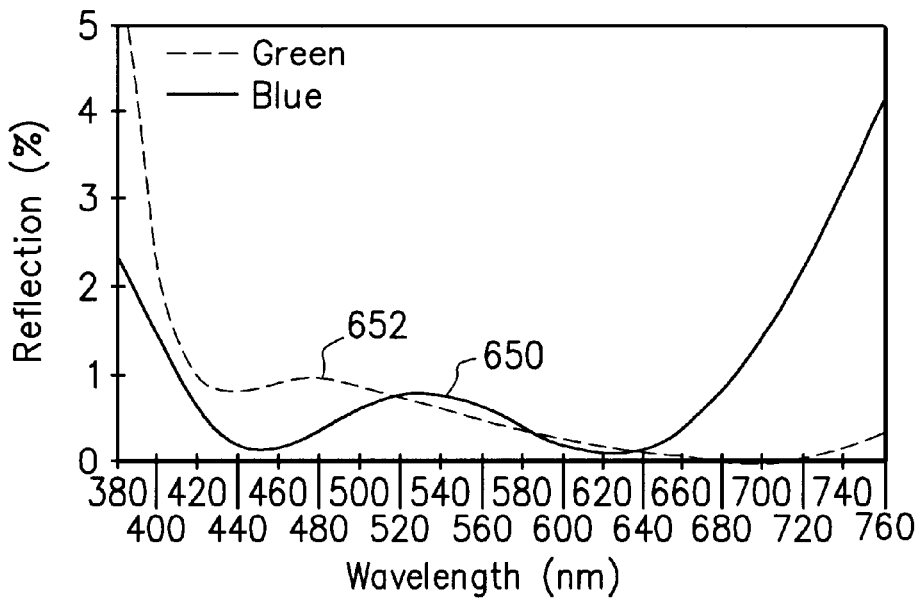
FIGS. 31 and 32 are plots of reflection versus incident light wavelengths for various coatings illustrating aspects of the present invention.
Figure 32:
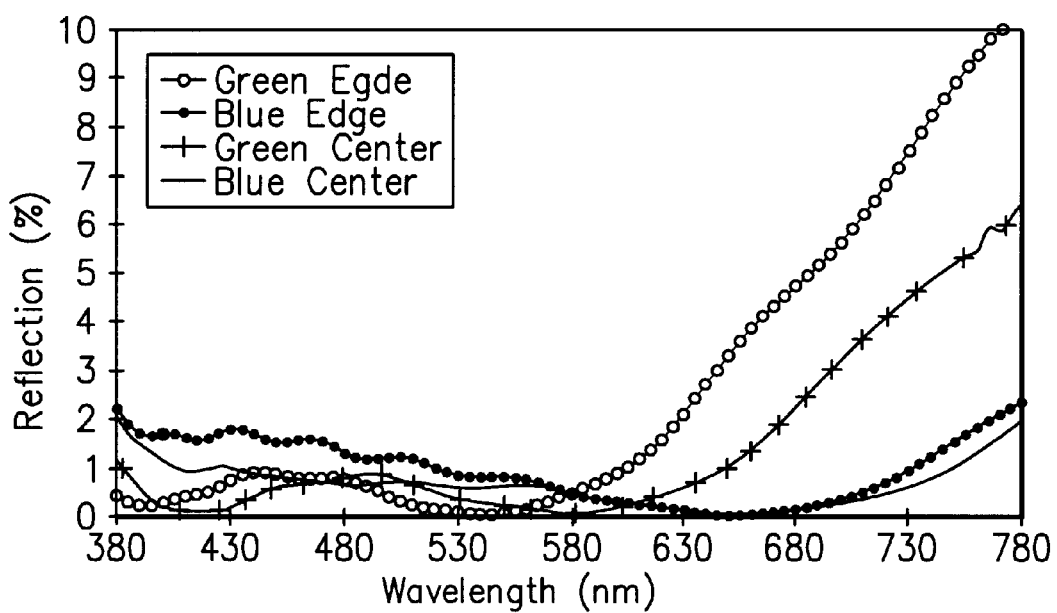

FIGS. 31 and 32 illustrate various aspects of the coatings of the present invention. FIG. 31 is a plot of reflection in percent as a function of light wavelength in nanometers. It compares the reflectance of the stack of Table I with a more conventional stack having a greenish color (dashed line).

Variations of 3% or more in deposited film thickness ordinarily cause significant and noticeable color variations. The green coloration, which is an effect of the "hump" 650 in the reflection spectrum (FIG. 31) appears to move toward the blue end of the spectrum when viewed at an oblique angle. When this happens, the reflectivity in the red end of the spectrum becomes more intense. This will eventually result in a pink or purple color (rather than the desired yellow/green).

In contrast, the stack of Table I (blue) produces a reflectance spectrum with a dominant amount of visible light reflectance in the blue portion of the spectrum as represented by the peak or hump 652 in the in the spectrum centered at about 480 nm. The blue coating produces very low reflectances well into the infra red region of the spectrum and is less than 0.5%, preferably less than 0.25% at 720 nm.

The effect of steep lens curvature is illustrated in FIG. 32. As can be seen, the reflectance at the red end of the spectrum at the center of each lens is higher for the green coating than for the blue coating. However, when the reflection is measured towards the edge of the lens it is clearly seen that the green coating suffers greatly increased reflectivity in the red part of the spectrum while the blue coating remains stable at a low red reflectivity.

The result of this increase in red reflection towards the edge of a lens is to turn the "green" coating into a bright purple color (Green+Red=Purple). This effect does not occur to any significant extent in the case of the blue coating. The net result of this decreased sensitivity to color roll off is that the need for standard lens curvature groupings to maintain color consistency during AR deposition is greatly reduced. It is apparent that steeply curved lens surfaces will maintain their color across either the whole surface, or across a greatly increased part of their surfaces (as compared to more conventional coatings such as the green coating).

B. Sun Lenses

It is conventional to provide sun lenses or sun glasses that selectively block wavelengths of light both in the visible and UV ranges. Such lenses have applications both for eye protection and fashion design. The wavelengths of light passing through the lens may be selected by employing light absorbent dyes in the plastic body. Alternatively, or in addition, mirror reflective coatings may be applied to the lens. These techniques may be applied to the steeply curved lenses of the present invention. Moreover, they may be used in conjunction with the anti-reflection coatings described above. For example, the above described AR coatings could be applied to the eye side optical surface of a lens containing a dye which partially blocks sunlight. Alternatively, the above described AR coating could be applied to the eye side optical surface of the lens while the anterior side optical surface is coated with a mirror coating, for example a vivid blue reflective coating.

C. Laser Protective Eyewear

The steeply curved, spherical surface lens elements described above may advantageously be used in laser protective eyewear. In preferred embodiments the eyewear is designed to locate the center of curvature of each lens on the respective centroid of rotation of the eye with which it is used. Further, the lens may be edged so that the lens extends approximately from the nasal to the temporal margins of the orbit and from the lower to the upper margins of the orbit. Alternatively, the lenses may be mounted in eye wear frames which extend to said orbit margins. These configurations have several beneficial effects. First, the lens can effectively surround the eye and reduce or prevent the leakage of stray light around the edges. Secondly, essentially all light incident on the lens which could be transmitted through the pupil will be within about 25° to 30° with respect to the normal to the tangent of the spherical surface. Higher angle incident light will not be directed through the pupil. Laser light blocking means on or in the lens can be tailored to block beams of laser light within this approximately 30° angular range of the normal to the tangent of the spherical surface.

Figure 30A:
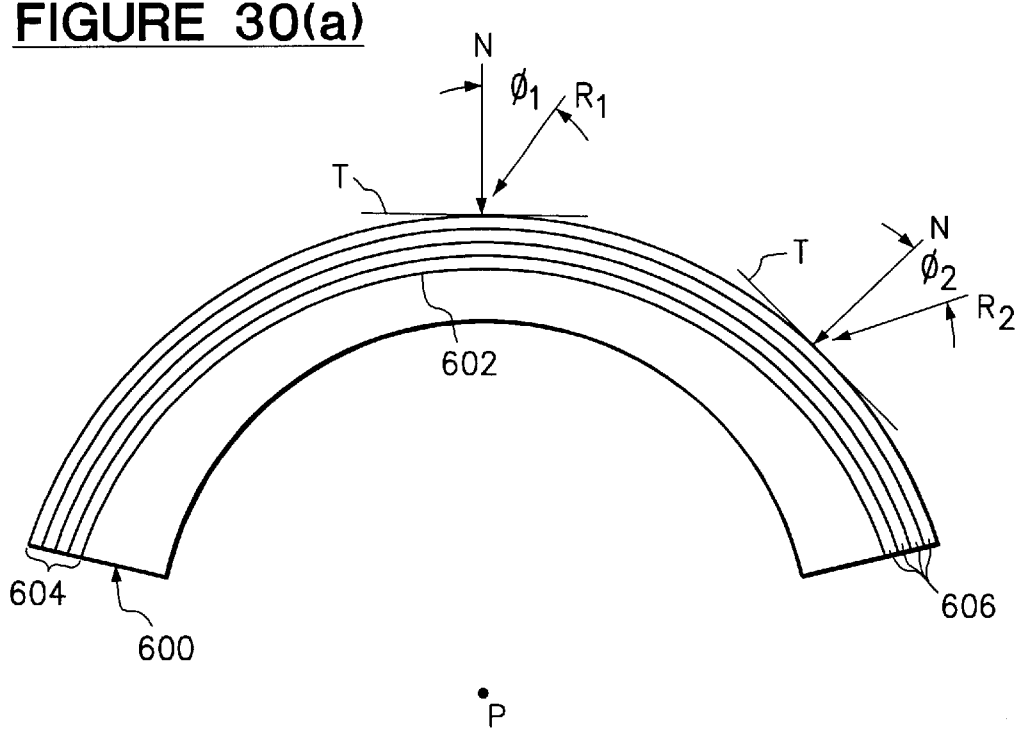
FIGS. 30(a), (b) and (c) are is a cross sectional views of various lens element with incident rays shown impinging their front surfaces.

It is known that band blocking optical filters can be sensitive to the incident angle of the light to be blocked. Typically such filters use normal incident light as a design center. The effectiveness of the filter typically varies and usually decreases with deviation in the incident angle from the normal. This geometry is illustrated in FIG. 30(a) for two arbitrary rays $R_1$ and $R_2$ which have angles of incidence $\phi_1$ and $\phi_2$, respectively. Angles $\phi_1$ and $\phi_2$ are measured with respect to normals $N_1$ and $N_2$ at the point the rays $R_1$ and $R_2$ intersect the surface of the lens. (The normals are perpendicular to tangent planes $T_1$ and $T_2$ at their respective points of intersection). Generally, for the filters discussed above, the greater $\phi$ is, the less effective the filtering effect will be.

Figure 30B:
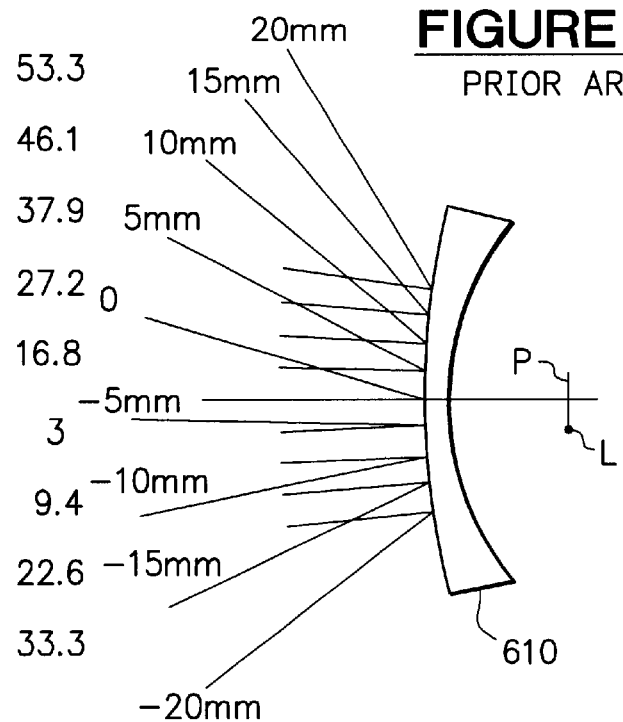
Figure 30C:
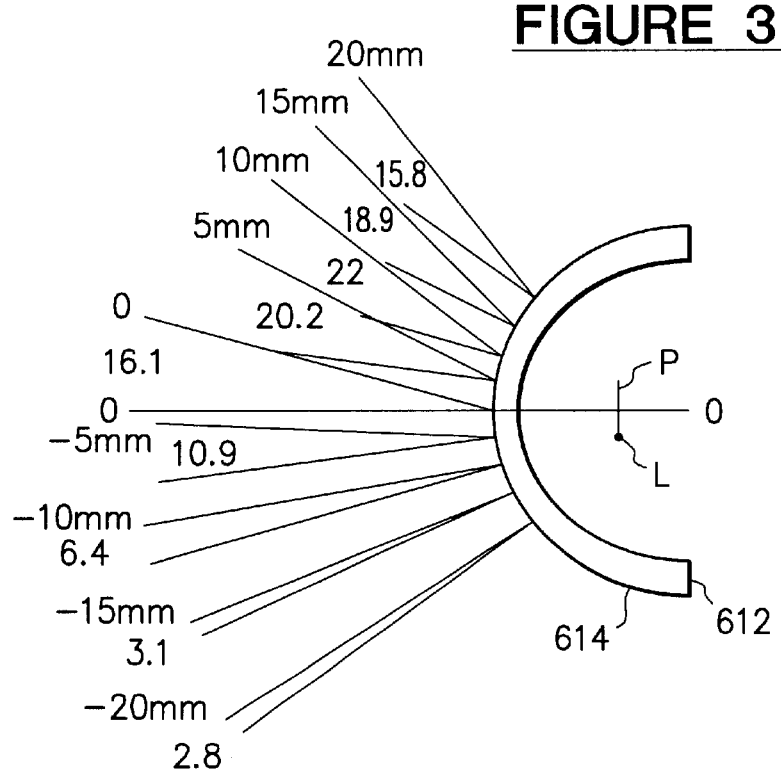

The steeply curved lenses of the present invention typically present a smaller range of relevant incidence angles $\phi$, which will permit use of filters with effective rejection angles up to, for example, about 30° from normal. This aspect of the steeply curved lenses is illustrated in a comparison of two lens examples given in FIGS. 30(b) and 30(c). The lens 610 shown in FIG. 30(b) is a Ostwalt section, −4 D base lens. The lens 612 shown in FIG. 30(c) is a steeply curved lens with −4 D through power and a front spherical surface 614 of about 15.5 D. The analysis of incident rays assumes both lenses have refractive indices of 1.5 and center thicknesses of about 2 mm. It is also assumed that a 1 cm diameter pupil P is located 2 cm behind the point where the back surface of the lens intersects its optical axis O—O.

Various incident rays are plotted in FIGS. 30(b) and 30(c). The rays are selected from ray bundles which intersect a plane $P_T$ tangent to each lens at the optical axis O—O. Bundles are examined at distances of 0, 5, 10, 15 and 20 mm above and below the optical axis O—O. From each bundle, a ray is selected which (i) has the largest angle $\phi$ with respect to a normal to the lens at the point of incidence on the lens surface and (ii) which will reach the lowest point L of the pupil when refracted by the lens. These selected rays are identified by their respective distances (e.g. 5 mm, 10 mm, etc.) above and below the optical axis on the plane $P_T$.

The following table presents the calculated angle $\phi$ for each of the incident rays for the lenses of FIGS. 30(b) and 30(c):

TABLE II

| Ray (mm from optical axis) | $\phi$ in degrees for lens of FIG. 30(b) | $\phi$ in degrees for lens of FIG. 30(c) |
| --- | --- | --- |
| 20 | 53.3 | 15.8 |
| 15 | 46.1 | 18.9 |
| 10 | 37.9 | 22.0 |
| 5 | 27.2 | 20.2 |
| 0 | 16.8 | 16.1 |
| −5 | 3.0 | 10.9 |
| −10 | −9.4 | 6.4 |
| −15 | −22.6 | 3.1 |
| −20 | −33.3 | 2.8 |

(The angles $\phi$ are expressed as both positive and negative angles. A positive angle indicates a clockwise beam rotation from the lens normal as shown in the FIG. and a negative angle indicates a counter clockwise beam rotation from the lens normal.)

In the example, $\phi$ for the Ostwalt section lens is greater than 30° at many locations and increases dramatically with distance from the optical axis to a high of 53.7° at the +20 mm location. In contrast, for the steeply curved lens of FIG. 30(c), the angle $\phi$ remains below 30°.

Selective blocking of laser light can be achieved with one or more optical band block filters. A preferred way of producing selective blocking of laser light is to employ a thin film stack tailored to block potentially injurious laser light. The following is an example of a band filter which effectively blocks two laser light wavelengths frequently used in telecommunications: 1310 nm and 1550 nm laser light. The optical filter is described in Table III in terms of layer composition and thickness.

TABLE III

| Material | Thicknesses (mn) |
| --- | --- |
| Air | |
| $SiO_2$ | 125.42 |
| $TiO_2$ | 161.11 |
| $SiO_2$ | 250.83 |
| $TiO_2$ | 161.11 |
| $SiO_2$ | 250.83 |
| $TiO_2$ | 161.11 |
| $SiO_2$ | 250.83 |
| $TiO_2$ | 161.11 |
| $SiO_2$ | 250.83 |
| $TiO_2$ | 161.11 |
| $SiO_2$ | 250.83 |
| $TiO_2$ | 161.11 |
| $SiO_2$ | 250.83 |
| $TiO_2$ | 161.11 |
| $SiO_2$ | 250.83 |
| $TiO_2$ | 161.11 |
| $SiO_2$ | 250.83 |
| $TiO_2$ | 161.11 |
| $SiO_2$ | 250.83 |
| $TiO_2$ | 161.11 |
| $SiO_2$ | 250.83 |
| $TiO_2$ | 161.11 |

TABLE III-continued

| Material | Thicknesses (mn) |
| --- | --- |
| SiO$_2$ | 250.83 |
| TiO$_2$ | 161.11 |
| SiO$_2$ | 125.42 |
| Polycarbonate | |

In optical design parlance, this stack is described by the expression:

"1.12(0.5LH0.5L)1.06(0.5LH0.5L)1.03(0.5LH0.5L)(LHL)^6
1.03(0.5LH0.5L)1.06(0.5LH0.5L)1.12(0.5LH0.5L)"

where H and L denote the quarter wavelength optical thickness at the target wavelength of the high refractive and low refractive index materials, respectively. In the example of TABLE III the low refractive index material is Silicon Dioxide and the high refractive index material is Titanium Dioxide. It will be understood that various other stacks of conventional design can be employed to provide a band block filter for protection from laser light.

Figure 33:
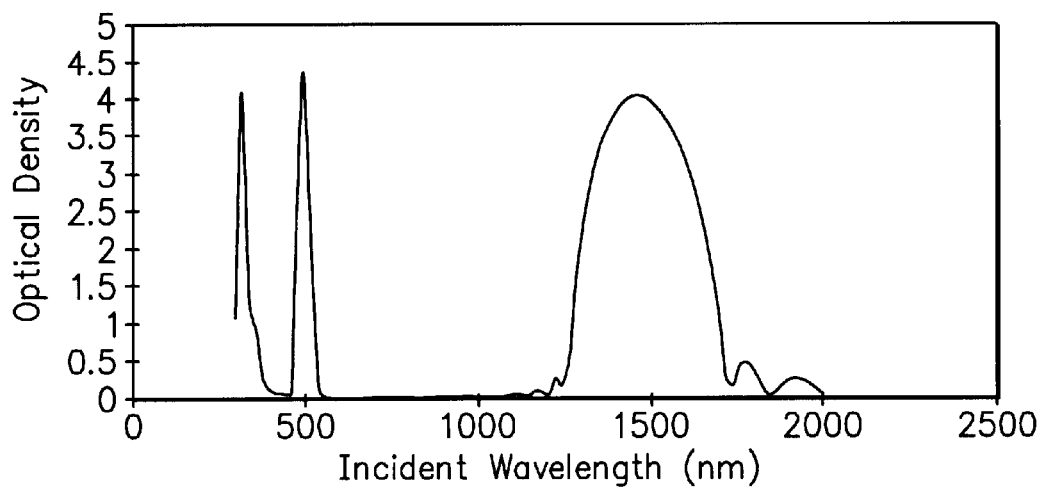
FIGS. 33 and 34 are plots of optical density for an example of a band block filter of a preferred embodiment of the present invention.

Continuing with the example of TABLE III, the optical density (negative of the logarithm of transmission percentage) is plotted as a function of incident light wavelength in FIG. 33. As can be seen from the Figure, the blocked band is a wide band centered at about 1400 nm. Most visible wavelengths are passed (i.e. the optical density is near zero).

The plot of FIG. 33 assumes a zero degree incidence angle φ with respect to a line N normal to a tangent T to the lens surface at the point of incidence (see FIG. 30(a)). The optical density of the stack is expected to vary as the incidence angle φ increases from zero. The expected deviation for S and P polarizations and incident light of 1310 nm and 1550 nm wavelengths are plotted in FIG. 34.

Figure 34:
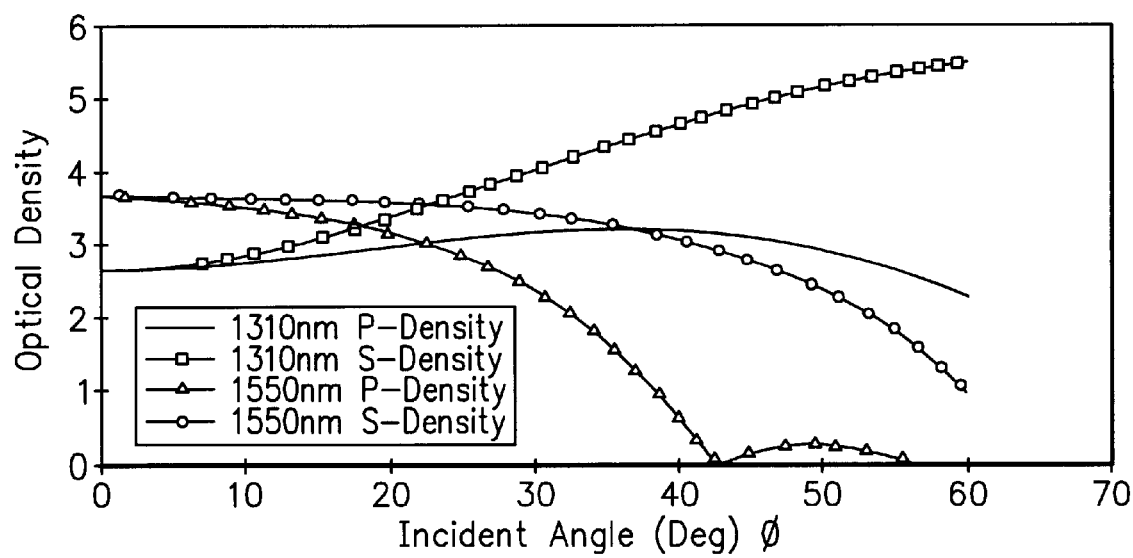

More specifically, in FIG. 34 optical density is plotted as a function of incidence angle θ from 0 to 60°. It will be understood that as angle of light incidence increases, the whole block band will shift left (towards blue). Because of this the optical density increases for the 1310 nm wavelength. The optical density of the 1550 line decreases as incident angle φ increases. For the stack of TABLE III, at angles below 30 degrees, less than about 0.7% of the light is transmitted and below 20 degrees, only about 0.2% light is transmitted, regardless of polarization. This is believed to be sufficient for commercial safety applications, although military requirements might be more stringent and require a stack design with greater optical density in a particular bands.

It will be observed from FIG. 34 that the transmittance of the stack remains below 1% for both wavelengths and polarizations at incident angles up to about 33°. Incident angles higher than this would not be directed toward the retina in the steeply curved lenses described herein whose center of curvature is located at about the centroid of rotation of the eye being protected. However, to insure against unwanted transmissions caused by strong reflections, refractions or light leaks, the lens body could also be molded from a thermoplastic containing a radiation absorbing dye.

Accordingly, novel, high optical quality lens elements with steep spherical curvature are provided with prescribed through-power and cyl correction, and mounted in spectacle frames adapted for use therewith. These designs are readily adapted for use in highly effective sunglasses and other protective eyewear such as laser protective eyewear.

The present invention has been described in connection with various embodiments and examples. However, the invention to be protected is defined by the following claims and equivalents thereof recognized in law.

What we claim is:

1. A lens adapted for mounting in eyewear, the lens having at least one spherical surface with a radius of curvature less than about 35 mm, the lens being adapted for positioning such that a center of curvature of the lens is located approximately at the centroid of rotation of the eye, wherein the lens is sufficiently large to provide a field of view greater than 55° in the temporal direction from the forward line of sight and wherein the lens has an anti-reflection coating which presents a generally uniform color across its anterior surface to an observer.

2. The lens of claim 1, wherein the front surface is the at least one spherical surface and has a radius of curvature of 33.25 mm±1 mm.

3. The lens of claim 1, wherein the lens has an anti-reflection coating on both the anterior and eye side optical surfaces.

4. The lens of claim 1, wherein the lens has a non-zero prescription through power.

5. The lens of claim 4, wherein the lens has an eye side surface which corrects for the wearer's astigmatism.

6. The lens of claim 1, wherein the anti-reflection coating is a dielectric stack applied to at least one optical surface of the lens which appears generally blue in color.

7. The lens of claim 1, wherein the coating is made up of layers having relatively high and relatively low refractive indices which are vacuum deposited on at least one optical surface of the lens.

8. The lens of claim 7, wherein the surface coating is a stack of silicon and zirconium oxide layers, at least one of the zirconium oxide layers being greater than about 100 nm in thickness.

9. The lens of claim 7, wherein the reflectance of coating for visible light has a local maximum at about 480 nm.

10. Sunglasses including an edged lens having a first optical surface which lies within a spherical shell defined by two concentric spheres having radii whose length differs by no more than 2 mm, the smaller of the radii being no more than 50 mm in length and wherein at least two points O and Q on the edge of the surface subtend an angle OPQ greater than 80° with respect to a center P of the shell, wherein the lens is mounted in eyewear such that a center of curvature of the anterior surface is located approximately on the centroid of rotation of an eye of the wearer in an as-worn position.

11. The lens of claim 10, wherein the first optical surface has a radius of curvature of 33.25±1 mm.

12. The lens of claim 10, wherein the first optical surface has a surface power of from 15.5 D to 16.5 D.

13. The lens of claim 12, wherein the first optical surface is the anterior lens surface and wherein the rear surface of the lens is configured so that the lens has a selected through power of +2 D to −5.75 D.

14. The lens of claim 10, wherein the rear surface of the lens is configured so that the lens has a selected astigmatism correction of up to 2.5 D.

15. The lens of claim 10, wherein the angle OPQ is greater than 90°.

16. The lens of claim 10, wherein the lens is made from a lens blank having an angle OPQ greater than 120°.

17. The lens of claim 10, wherein the lens presents a generally uniform color across its anterior surface to an observer.

18. The lens of claim 10, wherein the anterior surface is coated with a dielectric stack whose reflectance begins to decrease for incident light of a wavelength above about 380 nm and remains low throughout the remainder of the visible spectrum.

19. Protective spectacles comprising:
left and right lenses each having at least a front spherical surface, each spherical surface having a radius of curvature less than 35 mm; and
means for supporting the lenses on the face of the wearer so that the center of the spherical surface of each of the left and right lenses is located approximately on the centroid of rotation of the left and right eye, respectively, wherein the supporting means includes left and right temple pieces and a nose bridge and wherein each lens is sufficiently large to provide a field of view greater than 55° in the temporal direction from the forward line of sight of each eye, respectively, and means associated with each lens for at least partially blocking transmission to the respective eye of radiation incident on the lens.

20. The spectacles of claim 19, wherein the transmission blocking means is a multilayer film on each lens, the layers of the film having different refractive indices and thicknesses selected for at least partially blocking at least one selected portion of the spectrum of incident radiation.

21. The spectacles of claim 20, wherein the spectacles are sunglasses and ultraviolet light is at least partially blocked.

22. The spectacles of claim 20, wherein laser radiation in a selected spectral range is at least partially blocked.

23. The spectacles of claim 22, wherein infrared laser radiation is at least partially blocked.

24. The spectacles of claim 22, wherein incident laser radiation is in a band including at least one telecommunications laser light wavelength which is blocked sufficiently to reduce its power level to eye safe level.

25. The spectacles of claim 22, wherein each lens together with the supporting means extends from the nasal margin of the orbital region to the temporal margin of the orbital region and from the lower to the upper margins of the orbital region, so as to block incoming laser radiation from all angles incident on the pupil.

26. The spectacles of claim 22, wherein each lens extends from the nasal margin of the orbital region to the temporal margin of the orbital region and from the lower to the upper margins of the orbital region, so as to block incoming laser radiation from all angles incident on the pupil.

27. The spectacles of claim 19, wherein the transmission blocking means is a filter whose blocking properties are affected by the angle of incidence of rays incident on the lenses;
wherein, in the as worn position, light rays reaching a pupil of an eye of the wearer deviate by no more than 30° from a normal to the front surface of the respective lens at the point of incidence; and
wherein the filter is effective to reduce the power level of the incident ray to a safe level through angles of incidence at least as great as 30° from the normal to the front surface of the lenses at the point of incidence.

28. The spectacles of claim 19 wherein the radius of curvature of the front surface is between about 31 mm and 35 mm.

29. The spectacles of claim 19 wherein the radius of curvature of the front surface is 33.25 mm±1.

30. Eyewear comprising:
left and right lenses each having at least one spherical surface with a radius of curvature between about 31 mm and 35 mm; and
eyewear frames including left and right temple pieces and a nose bridge for supporting the lenses on the face of the wearer, so that the centers of the spherical surfaces of each of the left and right lenses are located approximately on the centroid of rotation of the left and right eye, respectively;
wherein each lens is edged so that an edge surface of the lens is approximately perpendicular to a tangent to its spherical surface;
each said edge surface of the left and right lenses lying on straight lines passing through the centroid of rotation of the left and right eye, respectively.

31. The eyewear of claim 30, wherein the eyewear frames are rimless.

32. The eyewear of claim 31, wherein the frames further comprise left and right temple fitments attached to the left and right lenses, respectively by fasteners whose principal axes are oriented approximately on lines passing through the center of curvature of the spherical surface.

33. The eyewear of claim 30, wherein the spherical surface of each lens is the front surface of the respective lens.

34. The eyewear of claim 30, wherein the edge surface of each lens intersects the spherical surface of the lens along a line which lies substantially outside of any single plane.

35. The eyewear of claim 30, wherein the edge surface is generated by a mill rotated about an axis which intersects the center of curvature of the spherical surface.

36. The eyewear of claim 35, wherein the mill cuts a grooved edge surface adapted to interfit with a rim of the eyewear frames.

37. The eyewear of claim 35, wherein the mill leaves a bead on the edge surface adapted to interfit with a channeled rim of the eyewear frames.

38. The eyewear of claim 35, wherein any sharp edge left by the mill is removed by beveling.

39. The eyewear of claim 30, wherein the edge of at least one of the lenses is substantially thicker than the lens center and wherein the edge surface of that lens is cut so that it subtends an arc $\Theta$ of no more than about 5° with respect to the center of curvature of the spherical surface where the arc lies in any plane which contains the optical axis of the lens.

40. Spectacles comprising:
left and right lenses each having a spherical front surface with the same first radius of curvature between 25 mm and 35 mm and a spherical back surface; and
spectacle frames including left and right temple pieces and a nose bridge for supporting the lenses on the face of the wearer, so that the centers of the spherical front surfaces of each of the left and right lenses are located approximately on the centroids of rotation of the left and right eyes, respectively.

41. The spectacles of claim 40 wherein the first radius of curvature is between 31 mm and 35 mm.

42. The spectacles of claim 40 wherein the first radius of curvature is 33.25 mm±1 mm.

43. The spectacles of claim 40, further comprising a rim connecting the left and right temple pieces with the nose bridge.

44. The spectacles of claim 40 wherein the spectacle frames are adjustable to locate the centers of the spherical front surfaces of each of the left and right lenses approximately on the centroids of rotation of the left and right eyes, respectively.

* * * * *